(12) United States Patent
Wang et al.

(10) Patent No.: US 10,898,861 B2
(45) Date of Patent: Jan. 26, 2021

(54) ULTRATHIN, CONDUCTIVE AND FOULING-RESISTANT ZWITTERIONIC POLYMER FILMS

(71) Applicant: Massachusetts Institute of Technology, Cambridge, MA (US)

(72) Inventors: Minghui Wang, Quincy, MA (US); Karen K. Gleason, Cambridge, MA (US); Peter Kovacik, Oxford (GB)

(73) Assignee: Massachusetts Institute of Technology, Cambridge, MA (US)

( * ) Notice: Subject to any disclaimer, the term of this patent is extended or adjusted under 35 U.S.C. 154(b) by 182 days.

(21) Appl. No.: 16/041,169

(22) Filed: Jul. 20, 2018

(65) Prior Publication Data

US 2019/0022594 A1 Jan. 24, 2019

Related U.S. Application Data

(60) Provisional application No. 62/534,888, filed on Jul. 20, 2017.

(51) Int. Cl.
| | | |
|---|---|---|
| *B01D 71/72* | (2006.01) | |
| *B01D 71/56* | (2006.01) | |
| *B01D 71/64* | (2006.01) | |
| *B01D 71/68* | (2006.01) | |
| *B01D 67/00* | (2006.01) | |
| *C02F 1/44* | (2006.01) | |

(Continued)

(52) U.S. Cl.
CPC .......... *B01D 65/08* (2013.01); *B01D 67/009* (2013.01); *B01D 67/0088* (2013.01); *B01D 71/56* (2013.01); *B01D 71/64* (2013.01); *B01D 71/68* (2013.01); *B01D 71/72* (2013.01); *B01D 61/025* (2013.01); *B01D 2321/168* (2013.01); *B01D 2325/04* (2013.01); *B01D 2325/18* (2013.01); *B01D 2325/26* (2013.01); *C02F 1/441* (2013.01); *C02F 2101/12* (2013.01); *C02F 2303/20* (2013.01)

(58) Field of Classification Search
None
See application file for complete search history.

(56) References Cited

U.S. PATENT DOCUMENTS 4,594,392 A * 6/1986 Hatch .................... A01N 59/00
525/327.1
5,164,424 A * 11/1992 Brueschke ......... B01D 67/0093
210/640

(Continued)

FOREIGN PATENT DOCUMENTS

WO WO-2019/032265 A2 2/2019

OTHER PUBLICATIONS

International Search Report and Written Opinion for International Application No. PCT/US2018/043072 dated Feb. 27, 2019.

*Primary Examiner* — Krishnan S Menon
*Assistant Examiner* — Brad Gordon
(74) *Attorney, Agent, or Firm* — Foley Hoag LLP; Dana M. Gordon; Alexander J. Chatterley

(57) ABSTRACT

Disclosed are methods of preparing antifouling coatings on reverse osmosis membranes with initiated vapor deposition or oxidative vapor deposition. The coatings enhance the stability and lifetime of membranes without sacrificing performance characteristics, such as permeability or salt retention.

12 Claims, 17 Drawing Sheets

(51) Int. Cl.
*B01D 61/02* (2006.01)
*B01D 65/08* (2006.01)
C02F 101/12 (2006.01)

(56) References Cited

U.S. PATENT DOCUMENTS

| | | |
|---|---|---|
| 2010/0048830 A1* | 2/2010 | Gleason ............... C08G 61/126 525/418 |
| 2011/0143149 A1 | 6/2011 | Shibayama et al. |
| 2013/0280527 A1 | 10/2013 | Niimi et al. |
| 2015/0037574 A1 | 2/2015 | Amano et al. |

* cited by examiner

FIG. 9
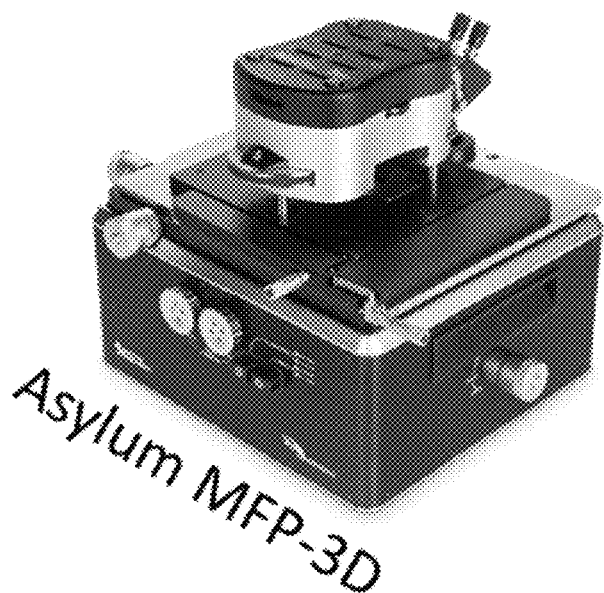
FIG. 10
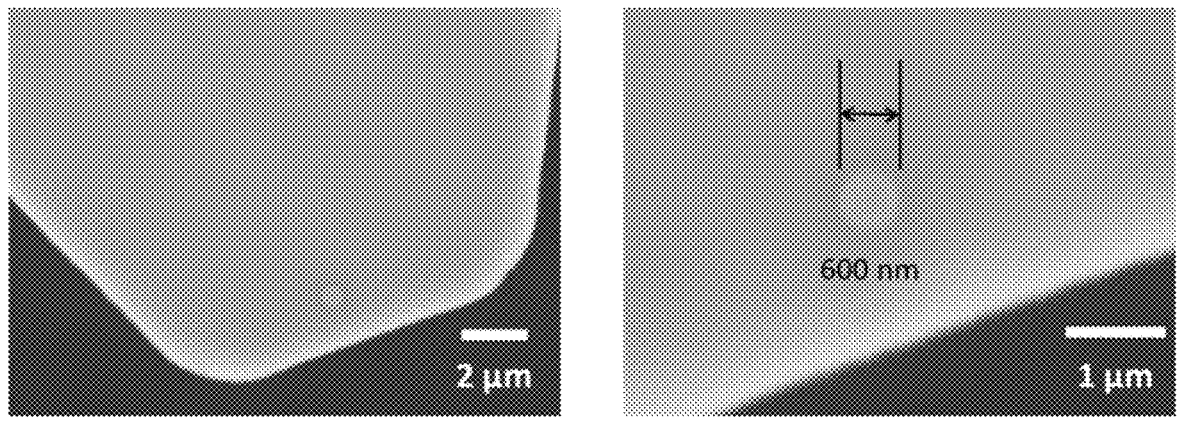
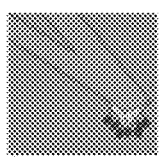
Tip functionalities:
-BSA, resemble non-specific proteins
-CH3, resemble hydrophobic interaction
-NH3, resemble interacting with cations
-COOH, resemble interacting with anions

FIG. 12

| Probe functionality | Statistical Differences at a 95% confidence level for different surfaces compared with zwitterionic PEDOT | | | | | |
|---|---|---|---|---|---|---|
| | PEDOT Vs Zwitterionic PEDOT | Zwitterionic p4VP-DVB Vs Zwitterionic PEDOT | Amphiphilic pPFDA-HEMA Vs Zwitterionic PEDOT | Bare Glass Vs Zwitterionic PEDOT | Gold Vs Zwitterionic PEDOT | PDMS Vs Zwitterionic PEDOT |
| -BSA | -- (16.5%) | -60.7% (-81.4%) | -23.4% (-46.9%) | -- (22.7%) | 576% (609%) | 1519% (1603%) |
| -CH3 | -- (-6.5%) | -- (-0.3%) | 107% (178%) | -6.8% (-33.9%) | 1459% (1500%) | 1637% (1709%) |
| -NH3 | -- (21.8%) | -48.1% (-62.4%) | 137% (155%) | 48.1% (62.4%) | 323% (362%) | 2029% (2056%) |
| -COOH | 1.50% (37.9%) | -- (-5.0%) | -- (-37.9%) | 288% (318%) | 382% (428%) | 717% (768%) |

*A blank with black "--" means one is not able to conclude that there is a difference between two data sets at a confidence level of 95%, the black numbers are statistical differences calculated at a confidence level of 95% (take the adhesion force value for zwitterionic PEDOT as unity); the grey numbers in parenthesis are the corresponding apparent differences, calculated by using equation:

$$\text{Apparent Difference} = \frac{\bar{x}_i - \bar{x}_j}{\bar{x}_j} \times 100\%$$

where $\bar{x}_i$ represents the adhesion force of surfaces other than zwitterionic PEDOT, $\bar{x}_j$ represents the adhesion force of zwitterionic PEDOT.

FIG. 14

| XPS Peaks | S 2p 3/2 | S 2p 1/2 | $SO_3^-$ 2p 3/2 | $SO_3^-$ 2p 1/2 |
|---|---|---|---|---|
| Binding Energy | 163.9 eV | 165.1 eV | 167.9 eV | 169.1 eV |
| Ratio | (m + n) | | m | |
| Area ratio at 0° (Top 10 nm) | 40.19 | 20.10 | 26.47 | 13.24 |
| % of EDOT units bearing SO3- moiety at top 10 nm | Percentage = m/(m+n) = (26.47+13.24)/(40.19+20.10) = 65.59% | | | |
| Area ratio at 70° (Top 3 nm) | 39.64 | 19.83 | 27.01 | 13.51 |
| % of EDOT units bearing SO3- moiety at top 10 nm | Percentage = m/(m+n) = (27.01+13.51)/(39.64+19.83) = 68.10% | | | |

FIG. 15

| Method | oCVD | [a]VPP | [b]EP | [c]Solution technique |
|---|---|---|---|---|
| One-step polymerization and film formation | Yes | No | No | No |
| Precise thickness control at nanometer level | Yes | Yes | Yes | No |
| Substrate-independence | Yes | No | No | No |
| All-dry, no solvent compatibility issue | Yes | No | No | No |
| Insoluble film, no need for post-crosslinking | Yes | Yes | Yes | No |

[a]VPP resembles oCVD technique for being a vapor phase deposition method, but it requires a pre-deposited oxidant layer, which is usually formed by solution techniques such as dip-coating or spin-coating etc. [b]EP requires a conductive substrate and is carried out in solution, for non-conductive substrates, a conductive layer has to be deposited first. [c]Solution technique includes the conjugated polymer synthesis step and the film formation step, therefore, as synthesized conjugated polymer has to be soluble for film formation. Take PEDOT as an example, PSS was introduced during polymerization to render PEDOT:PSS that is soluble in water. The enhancement in solubility has one drawback that is it usually needs post-crosslinking to enhance film stability for applications involving liquid interaction.

ULTRATHIN, CONDUCTIVE AND FOULING-RESISTANT ZWITTERIONIC POLYMER FILMS

RELATED APPLICATION

This application claims the benefit of priority to U.S. Provisional Patent Application No. 62/534,888, filed on Jul. 20, 2017. The contents of which is hereby incorporated by reference in its entirety.

GOVERNMENT SUPPORT

This invention was made with Government support under Grant No. W911NF-13-D-0001 awarded by the Army Research Office, and Grant No. AR0000294 awarded by the Department of Energy. The Government has certain rights in the invention.

BACKGROUND

Fouling refers to the undesirable attachment of organic matter, biomolecules, and microbes on submerged surfaces. Fouling diminishes the performance of devices involving these submerged surfaces and is considered the bottle-neck issue for various applications in the biomedical industry, food processing, and water treatment. Membrane fouling is a serious problem in processes such as reverse osmosis (RO) water desalination, industrial water treatment, juice concentration, and hemodialysis. On a separation membrane (e.g., a RO membrane), a biofilm matrix forms and acts as a secondary membrane, which adversely affects the separation capabilities of the membrane. The biofilm causes a significant drop in trans-membrane pressure resulting in a decline in permeate water flux with time. To keep the permeate flux at optimum levels, higher operating pressures are required. Furthermore, the physical damage of the membrane caused by the biofilm results in increase in the salt passage (i.e., reduced salt rejection). To combat the adverse effects of biofouling, membranes must be frequently cleaned with harsh chemicals; chemical treatment of the membrane, in turn, results in shorter membrane life. The cumulative effect of all these factors causes an enormous increase in operating cost of the desalination process.

One approach is coating surfaces with an amphiphilic polymer possessing nanoscale heterogeneities. Alternatively, surfaces have been rendered hydrophilic by applying ethylene glycol (EG) based oligomers and polymers or zwitterion-bearing polymers which become highly hydrated and fouling resistant in the aqueous solution. Herein, the zwitterion-bearing polymers, or zwitteronic polymers refer to polymers bearing 1 to 1 ratio of positive charges and negative charges in the same polymer chain. A more narrowed definition describes zwitterionic polymers as polymers bearing one positive charge and one negative charge in the same repeat unit, which is the case in sulfobetaine and carboxybetaine based polymers.

Zwitterionic materials have been explored for their ultra-low protein adsorption and outstanding antifouling properties, and have been extensively investigated as hydrophilic or fouling-resistance modifiers. However, the vast majority of the fouling-resistant polymer coatings are insulators instead of conductive polymers, which limits their applications in scenarios such as electrolysis based self-cleaning of membrane filtration/desalination system and electrodes in biomedical applications, where both fouling-resistance and conductivity are critical for stability of performance over time.

There exists a need for an efficient, reliable, environmental-friendly, solvent-less method of depositing chemically-stable antifouling coatings on reverse osmosis membranes.

SUMMARY OF THE INVENTION

In certain aspects, the invention relates to the solventless preparation of films of poly(3,4-ethylenedioxythiophene) (PEDOT) thin films using oxidative chemical vapor deposition (oCVD). In certain embodiments, PEDOT repeat units in films deposited by oCVD are subject to post-deposition functionalization by 3-bromopropionic acid (3-BPA) or 1,3-propanesultone (PS) and converted to zwitterionic structures, which are fouling resistant.

In other aspects, the invention relates to the solventless preparation of films of poly(4-vinylpyridine-co-divinylbenzene) (p(4-VP-DVB)) thin films using initiated chemical vapor deposition (iCVD). In certain embodiments, pyridine repeat units in films deposited by iCVD are subject to post-deposition functionalization by 3-bromopropionic acid (3-BPA) or 1,3-propanesultone (PS) and converted to zwitterionic structures, which are fouling resistant.

BRIEF DESCRIPTION OF THE DRAWINGS

FIG. 9 depicts an Asylum MFP-3D instrument.

FIG. 10 depicts the SEM image of a force probe tip, with a 600 nm colloidal $SiO_2$ bead attached to the end of the tip. The colloidal $SiO_2$ bead was functionalized by either -BSA, —$CH_3$, —$NH_3$ or —COOH functional groups. The SEM images were recorded by a Hitachi TM3000 Tabletop scanning electron microscope, at 10 kV.

FIG. 12 depicts the statistical analysis of adhesion forces measured for different surfaces.

FIG. 14 depicts the area ratio of S 2p peaks for zwitterionic PEDOT at different collection angles.

FIG. 15 depicts a comparison of methods of synthesis and formation of conjugated polymer films.

DETAILED DESCRIPTION OF THE INVENTION

Figure 6:
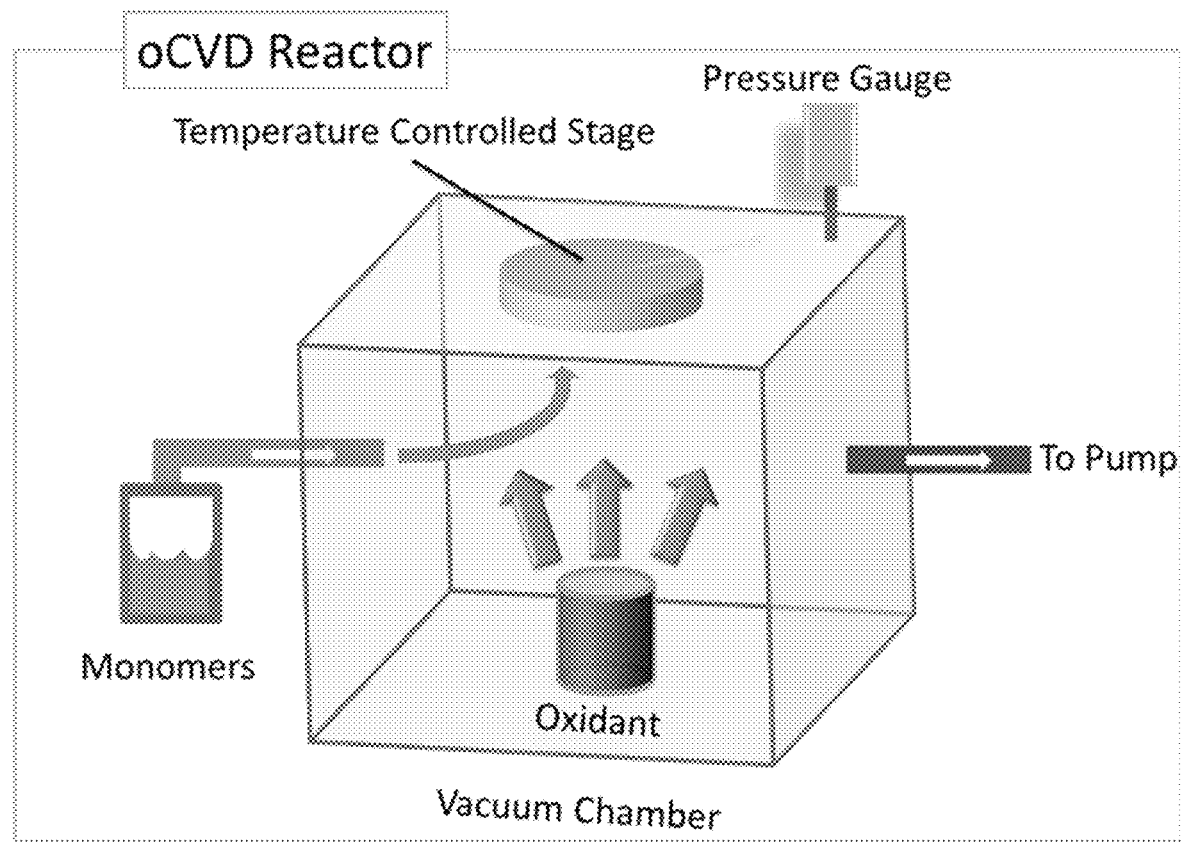
FIG. 6 depicts the oxidative Chemical Vapor Deposition (oCVD) process.

Described are intrinsically conductive solution processed poly(3,4-ethylenedioxythiophene) (PEDOT) films and their zwitterionic derivative via the oxidative chemical vapor deposition (oCVD) process, and investigated their potential for anti-fouling applications. However, in order to enhance the conductivity and processability of pristine PEDOT, poly(styrene sulfonate) (PSS) is routinely doped into the PEDOT system. The added hydrophilicity in the resulting PEDOT:PSS often cause long term stability issues. Therefore, post-crosslinking steps are usually carried out to enhance the stability of PEDOT:PSS, which increase the complexity to the fabrication process. Herein, the use of an alternative technique, oxidative chemical vapor deposition (oCVD), to synthesize water insoluble, intrinsically conductive PEDOT thin films, and more importantly, their zwitterionic derivative, with the aim of combining conductivity and fouling-resistance into one interface.

oCVD is an effective technique for synthesizing ultra-thin and large area conjugated polymer films for applications such as sensors, photovoltaics, thin film transistors and supercapacitors. The schematic of an oCVD process is shown in supplement FIG. 6. Compared to three other common techniques for conjugated polymer deposition: vapor phase polymerization deposition (VPP), electropolymerization (EP), electrochemical deposition (ED) and conventional solution polymerization, oCVD has the advantages of simultaneously accomplishing polymerization and film formation in one step. Moreover the deposition is substrate independent and resulting films are water-insoluble. These characteristics are crucial for the anti-fouling applications discussed in this article. The detailed comparison of oCVD technique with VPP, EP and solution based techniques are depicted in FIG. 15.

Figure 7:
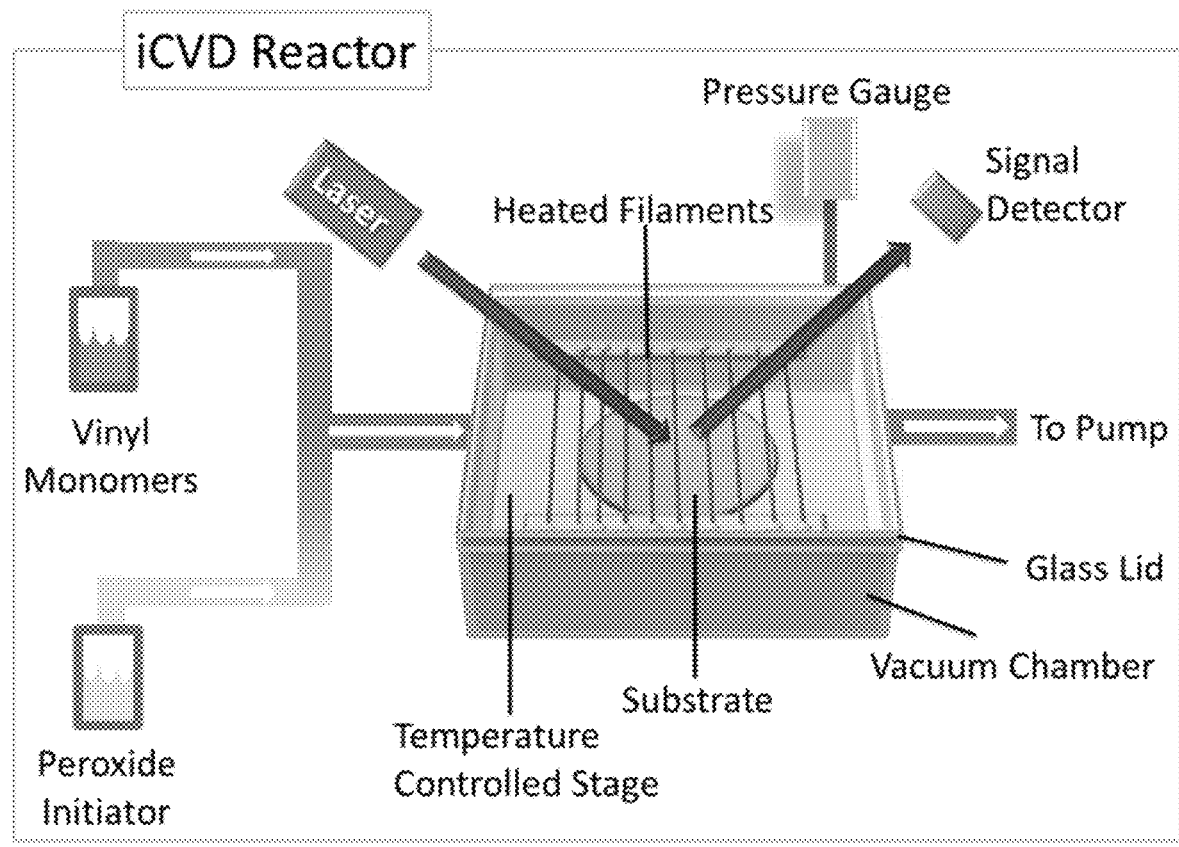
FIG. 7 depicts the initiative Chemical Vapor Deposition (iCVD) process.
Figure 13:
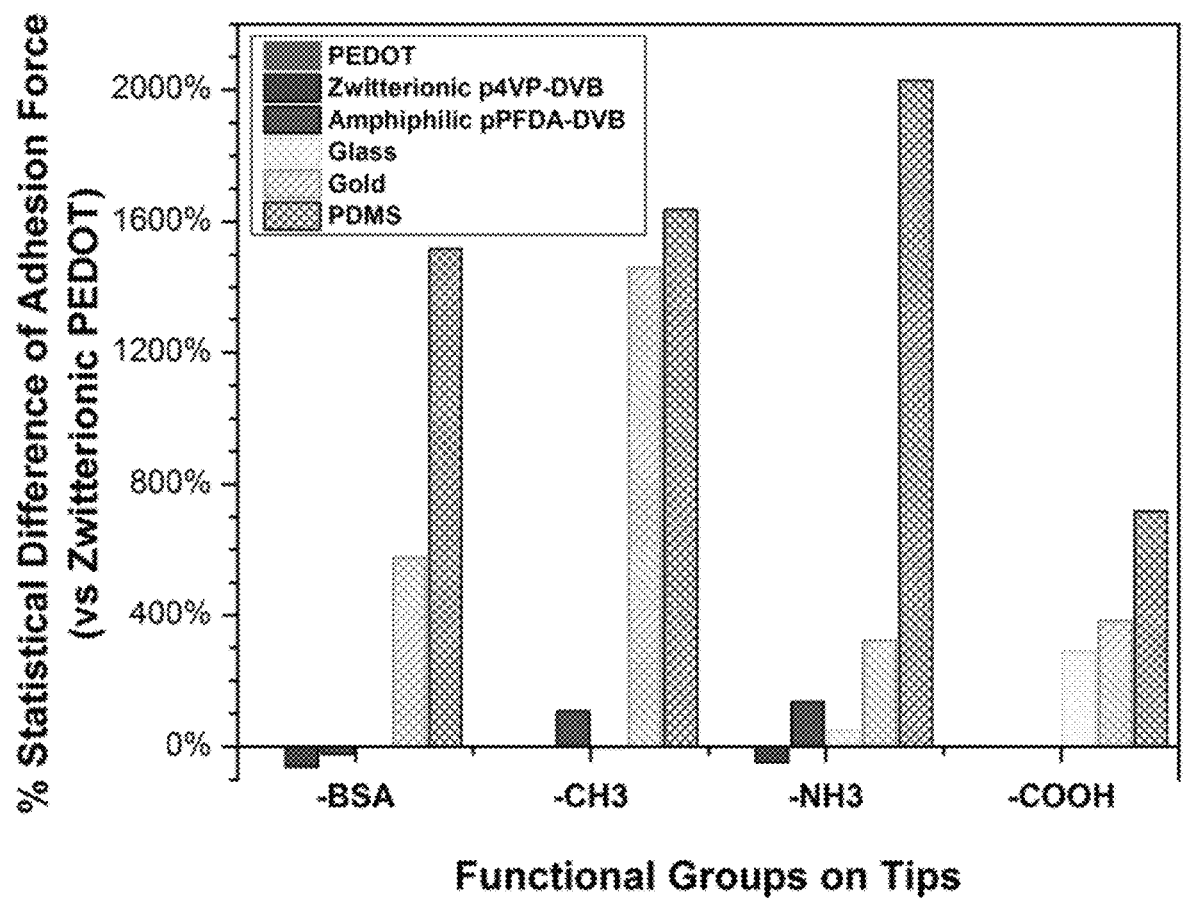
FIG. 13 depicts the statistical difference in adhesion forces of PEDOT, zwitterionic p(4VP-DVB), amphiphilic p(PFDA-DVB), glass, gold, and polydimethylsiloxane, with a 95% confidence level.
Figure 16:
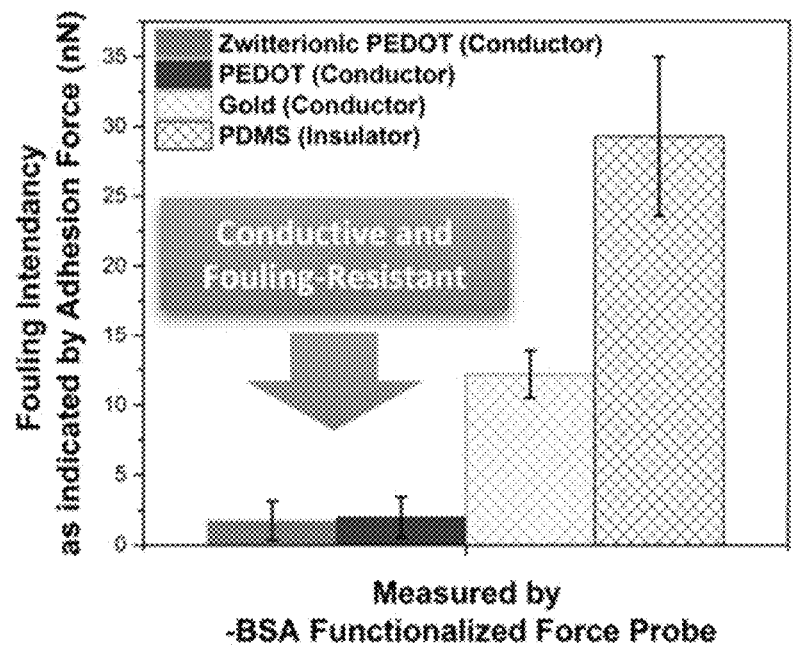
FIG. 16 depicts a comparison of the fouling intendancies of Zwitterionic PEDOT, PEDOT, gold, and polydimethylsiloxane (PDMS).

The fouling-resistant performances of PEDOT and its zwitterionic derivative were evaluated by a molecular force probe (MFP) analysis (supplement FIGS. 5, 12, and 13) which allowed the fouling intendancy to be quantified by measuring the adhesion force between a functionalized force probe (e.g., an AFM cantilever with a bovine serum albumin, -BSA, functionalized sphere tip, supplement FIGS. 12 and 13) and a surface. A larger adhesion force indicates a higher fouling intendancy (or a less fouling-resistance) for a specific functionality/surface pair. The accuracy of the MFP technique to quantify surface fouling-resistance was verified by previous studies using fouling caused membrane flux change, conventional foulant incubating techniques and/or quartz crystal microbalance with dissipation (QCM-D). The MFP measurements were also carried out for other surfaces, including highly fouling-resistant poly(4-vinylpyridine-co-divinylbenzene) (p4VP-DVB) derived zwitterionic coating and amphiphilic poly(1H,1H,2H,2H-perfluorodecyl acrylate-co-2-hydroxyethyl methacrylate) (pPFDA-HEMA) that were synthesized by the initiated chemical vapor deposition (iCVD) process (supplement FIG. 7). Fouling-resistant bare glass surface, and fouling-prone gold coated silicon wafer and polydimethylsiloxane (PDMS) surface were also included as controls. The results indicate the fouling resistances of both PEDOT and its zwitterionic derivative are much better than that of gold and PDMS surfaces, and are comparable to the fouling-resistant performances of zwitterionic p4VP-DVB, amphiphilic pPFDA-HEMA, and glass surfaces. The hydration level of the surface is hypothesized to be the key factor determining the surface fouling-resistance, with a smaller role played by the surface charge.

In addition, complementary characterization included Fourier Transform Infrared Spectroscopy (FTIR), X-ray photoelectron spectroscopy (XPS), variable angle spectroscopic ellipsometry (VASE), profilometry, water contact angle (WCA) measurements, four-point sheet-resistance measurement, atomic force microscopy (AFM) and surface û-potential measurements. The results demonstrate the successful synthesis of the intrinsically conductive polymeric films and their physiochemical properties.

Overview

In certain aspects, the invention relates to the solventless preparation of films of poly(3,4-ethylenedioxythiophene) (PEDOT) thin films using oxidative chemical vapor deposition (oCVD). In certain embodiments, EDOT repeat units in films deposited by oCVD are subject to post-deposition functionalization by 3-bromopropionic acid (3-BPA) or 1,3-propanesultone (PS) and converted to zwitterionic structures, which are fouling resistant. In certain embodiments, PEDOT repeat units in films deposited by oCVD are subject to post-deposition functionalization by 1,3-propanesultone (PS) and converted to zwitterionic structures, which are fouling resistant.

In other aspects, the invention relates to the solventless preparation of films of poly(4-vinylpyridine-co-divinylbenzene) (p(4-VP-DVB)) thin films using initiated chemical vapor deposition (iCVD). In certain embodiments, pyridine repeat units in films deposited by iCVD are subject to post-deposition functionalization by 3-bromopropionic acid (3-BPA) or 1,3-propanesultone (PS) and converted to zwitterionic structures, which are fouling resistant. In certain embodiments, pyridine repeat units in films deposited by iCVD are subject to post-deposition functionalization by 1,3-propanesultone (PS) and converted to zwitterionic structures, which are fouling resistant.

In certain embodiments, the invention relates to an antifouling coating. The coating may derive from p(4-VP-DVB) or PEDOT, which has been used as the precursor for antimicrobial coatings. In certain embodiments, quaternization is performed on p(4-VP-DVB) or PEDOT to obtain a positively-charged surface that is able to penetrate and degrade cell membranes of various microbes. However, the surface charge induces attachment of proteins and microbes with the opposite charge, and these species can remain on the surface and diminish the surface antimicrobial activity. So, the p(4-VP-DVB) or PEDOT is reacted with 3-BPA or PS to obtain a zwitterionic chemistry with balanced surface charge.

In certain embodiments, the coating is deposited on commercially available reverse osmosis (RO) membranes via iCVD or oCVD, which are vapor phase deposition technique(s), followed by a vapor phase derivatization. In certain embodiments, the vapor-phase deposition and derivatization enables surface modification of delicate substrates, such as RO membranes. In certain embodiments, the invention relates to quaternization by 3-BPA or PS in the vapor phase. In certain embodiments, since surface tension and de-wetting are avoided, the all-dry process conforms to the geometry of the underlying substrate. In addition, the benign reaction conditions allow full retention of functionalities. In certain embodiments, the substrate-independent method is time-efficient and scalable to industrial scale roll-to-roll infrastructure. In certain embodiments, multiple substrates can be coated simultaneously.

In certain embodiments, the iCVD synthesis is carried out at low substrate temperature (20° C.) to produce robustly adhered, smooth, ultra-thin layers (30 nm) directly on even delicate substrates, such as RO membranes without damaging them.

In certain embodiments, the oCVD synthesis is carried out at about 140° C. to produce robustly adhered, smooth, ultra-thin layers (100 nm) directly on even delicate substrates, such as RO membranes without damaging them.

Chemistry of the deposited copolymer films may be controlled by adjusting the flow rates of the monomers (i.e., 4-VP, PEDOT, DVB). Conversion of as-deposited copolymer films to zwitterionic moieties was confirmed by FTIR and high resolution XPS N1s scans. Water contact angle (WCA) measurements revealed that, in certain embodiments, the modified RO membranes were more hydrophilic as compared to their counterpart bare membranes and, furthermore, deposited copolymer coatings were found stable in DI water. Biopolymer adsorption of the deposited copolymer coatings was investigated by molecular force probes (MFP) using a model foulant (bovin serum albumin) (BSA).

Biofouling propensity of the optimized zwitterionic coating was investigated by counting the attached E. coli cells under static condition. In certain embodiments, bacterial adhesion results revealed that the modified membranes showed 97% less adhesion of micro-organism when compared to bare membranes indicating the effectiveness and superior performance of optimized copolymer coatings against bacterial adhesion. Performance evaluation (permeate flux and % salt rejection) of the modified membranes was measured utilizing cross flow permeation cells and compared to the virgin RO membranes. In certain embodiments, surface topology studies by AFM demonstrated that modified RO membranes showed lower RMS roughness when compared to virgin RO membranes.

Oxidative Chemical Vapor Deposition

In certain embodiments, oxidative chemical vapor deposition takes place in a reactor. In certain embodiments, precursor molecules, consisting essentially of a chemical metal-containing oxidant and a monomer species, are fed into the reactor. In certain embodiments, a variety of monomer species may be polymerized and deposited by oCVD; these monomer species are well-known in the art. In certain embodiments, this process occurs at a range of pressures from atmospheric pressure to low vacuum. In certain embodiments, the pressure is from about 5 mtorr to about 760 torr. In certain embodiments, the pressure is from about 5 mtorr to about 500 mtorr. In certain embodiments, the pressure is about 5 mtorr, about 10 mtorr, about 15 mtorr, about 30 mtorr, about 50 mtorr, about 75 mtorr, about 100 mtorr, about 125 mtorr, about 150 mtorr, about 175 mtorr, about 200 mtorr, about 225 mtorr, about 250 mtorr, about 275 mtorr, about 300 mtorr, about 325 mtorr, about 350 mtorr, about 375 mtorr, about 400 mtorr, about 425 mtorr, about 450 mtorr, about 475 mtorr, about 500 mtorr, about 600 mtorr, about 700 mtorr, about 800 mtorr, about 900 mtorr, about 1 torr, about 2 torr, about 3 torr, about 4 torr, about 5 torr, about 6 torr, about 7 torr, about 8 torr, about 9 torr, or about 10 torr.

In certain embodiments, chemical metal-containing oxidant species are heavy, but can be sublimed onto a substrate surface using a carrier gas and a heated, porous crucible installed inside the reactor. In certain embodiments, carrier gases and metal-containing oxidants useful in oCVD are well-known in the art. In certain embodiments, evaporation of the oxidant takes place in a resistively heated container inside the reaction chamber. In certain embodiments, evaporation of the oxidant takes place in a resistively heated container inside the reaction chamber underneath the substrate surface to be coated. In certain embodiments, the monomer species is delivered from a source external to the reactor. In certain embodiments, the metal-containing oxidant forms a thin, conformational layer on the substrate surface, which reacts with monomer molecules as they adsorb. Oxidants in the vapor form can also be delivered for this polymerization process, for example, bromine ($Br_2$) and transition-metal-containing liquid oxidants (e.g., $VOCl_3$, $VOCl_4$).

In certain embodiments, acid-catalyzed side reactions may be reduced or eliminated using one or more the following techniques: introducing a base, including but not limited to pyridine, to react with any acid that is formed in situ; heating the substrate to temperatures above about 60°

C., about 70° C., about 80° C. or about 90° C., for example, to accelerate evaporation of the acid as it is formed; and biasing the substrate with a positive charge using a DC power supply to favor the oxidation of monomeric and oligomeric species adsorbed on the substrate.

In certain embodiments, pyridine repeat units in films deposited by oCVD are subject to post-deposition functionalization by 3-BPA or PS and converted to zwitterionic structures, which are fouling resistant. In certain embodiments, the antifouling coatings prepared by a solventless procedure are useful in the water desalination industry. In certain embodiments, the films are applied to reverse osmosis (RO) desalination membranes. In certain embodiments, the salt-rejection properties of the RO membranes remain the same after the modification, indicating this mild process does not affect the extremely delicate semipermeable layer. In certain embodiments, permeability to water is affected only slightly by the coating. In certain embodiments, tunable crosslinking density gives rise to adjustable water permeability.

Initiated Chemical Vapor Deposition

Materials-processing often involves the deposition of films or layers on a surface of a substrate. One manner of effecting the deposition of such films or layers is through chemical vapor deposition (CVD). CVD involves a chemical reaction of vapor phase chemicals or reactants that contain the constituents to be deposited on the substrate. Reactant gases are introduced into a reaction chamber or reactor, and are decomposed and reacted at a heated surface to form the desired film or layer.

One method of CVD is initiated CVD (iCVD). In an iCVD process, thin filament wires are heated, thus supplying the energy to fragment a thermally-labile initiator, thereby forming a radical at moderate temperatures. The use of an initiator not only allows the chemistry to be controlled, but also accelerates film growth and provides control of molecular weight and rate. The energy input is low due to the low filament temperatures, but high growth rates may be achieved. The process progresses independent from the shape or composition of the substrate, is easily scalable, and easily integrated with other processes.

In certain embodiments, iCVD takes place in a reactor. In certain embodiments, a variety of monomer species may be polymerized and deposited by iCVD; these monomer species are well-known in the art. In certain embodiments, the surface to be coated is placed on a stage in the reactor and gaseous precursor molecules are fed into the reactor; the stage may be the bottom of the reactor and not a separate entity. In certain embodiments, a variety of carrier gases are useful in iCVD; these carrier gases are well-known in the art.

In certain embodiments, the iCVD reactor has automated electronics to control reactor pressure and to control reactant flow rates. In certain embodiments, any unreacted vapors may be exhausted from the system.

In certain embodiments, the iCVD coating process can take place at a range of pressures from atmospheric pressure to low vacuum. In certain embodiments, the pressure is less than about 50 torr. In certain embodiments, the pressure is less than about 40 torr. In certain embodiments, the pressure is less than about 30 torr. In certain embodiments, the pressure is less than about 20 torr. In certain embodiments, the pressure is less than about 10 torr. In certain embodiments, the pressure is less than about 5 torr. In certain embodiments, the pressure is less than about 1 torr. In certain embodiments, the pressure is less than about 0.7 torr. In certain embodiments, the pressure is less than about 0.4 torr. In certain embodiments, the pressure is about 50 torr. In certain embodiments, the pressure is about 40 torr. In certain embodiments, the pressure is about 30 torr. In certain embodiments, the pressure is about 20 torr. In certain embodiments, the pressure is about 10 torr. In certain embodiments, the pressure is about 5 torr. In certain embodiments, the pressure is about 1 torr. In certain embodiments, the pressure is about 0.7 torr. In certain embodiments, the pressure is about 0. torr. In certain embodiments, the pressure is about 0.5 torr. In certain embodiments, the pressure is about 0.4 torr. In certain embodiments, the pressure is about 0.3 torr. In certain embodiments, the pressure is about 0.2 torr. In certain embodiments, the pressure is about 0.1 torr. In certain embodiments, the pressure is about 1 torr; about 0.9 torr; about 0.8 torr; about 0.7 torr; about 0.6 torr; about 0.5 torr; about 0.4 torr; about 0.3 torr; about 0.2 torr; or about 0.1 torr.

In certain embodiments, the flow rate of the monomer can be adjusted in the iCVD method. In certain embodiments, the monomer flow rate is about 100 sccm (standard cubic centimeters per minute). In certain embodiments, the monomer flow rate is about 90 sccm. In certain embodiments, the monomer flow rate is about 80 sccm. In certain embodiments, the monomer flow rate is about 70 sccm. In certain embodiments, the monomer flow rate is about 60 sccm. In certain embodiments, the monomer flow rate is about 50 sccm. In certain embodiments, the monomer flow rate is about 40 sccm. In certain embodiments, the monomer flow rate is about 30 sccm. In certain embodiments, the monomer flow rate is about 20 sccm. In certain embodiments, the monomer flow rate is less than about 100 sccm. In certain embodiments, the monomer flow rate is less than about 90 sccm. In certain embodiments, the monomer flow rate is less than about 80 sccm. In certain embodiments, the monomer flow rate is less than about 70 sccm. In certain embodiments, the monomer flow rate is less than about 60 sccm. In certain embodiments, the monomer flow rate is less than about 50 sccm. In certain embodiments, the monomer flow rate is less than about 40 sccm. In certain embodiments, the monomer flow rate is less than about 30 sccm. In certain embodiments, the monomer flow rate is less than about 20 sccm. In certain embodiments, the monomer flow rate is about 15 sccm. In certain embodiments, the flow rate is less than about 15 sccm. In certain embodiments, the monomer flow rate is about 14 sccm. In certain embodiments, the flow rate is less than about 14 sccm. In certain embodiments, the monomer flow rate is about 13 sccm. In certain embodiments, the flow rate is less than about 13 sccm. In certain embodiments, the monomer flow rate is about 12 sccm. In certain embodiments, the flow rate is less than about 12 sccm. In certain embodiments, the monomer flow rate is about 11 sccm. In certain embodiments, the flow rate is less than about 11 sccm. In certain embodiments, the monomer flow rate is about 10 sccm. In certain embodiments, the flow rate is less than about 10 sccm. In certain embodiments, the monomer flow rate is about 9 sccm. In certain embodiments, the flow rate is less than about 9 sccm. In certain embodiments, the monomer flow rate is about 8 sccm. In certain embodiments, the flow rate is less than about 8 sccm. In certain embodiments, the monomer flow rate is about 7 sccm. In certain embodiments, the flow rate is less than about 7 sccm. In certain embodiments, the monomer flow rate is about 6 sccm. In certain embodiments, the flow rate is less than about 6 sccm. In certain embodiments, the monomer flow rate is about 5 sccm. In certain embodiments, the flow rate is less than about 5 sccm. In certain embodiments, the monomer flow rate is about 3 sccm. In certain embodiments, the flow rate is less than about 3 sccm. In certain embodiments, the monomer flow rate is about 1.5 sccm. In certain embodiments, the flow rate is less than about 1.5 sccm. In certain embodiments, the monomer flow rate is about 0.75 sccm. In certain embodiments, the flow rate is less than about 0.75 sccm. In certain embodiments, the monomer flow rate is about 0.6 sccm. In certain embodiments, the flow rate is less than about 0.6 sccm. In certain embodiments, the monomer flow rate is about 0.5 sccm. In certain embodiments, the flow rate is less than about 0.5 sccm. When more than one monomer is used (i.e., to deposit co-polymers), the flow rate of the additional monomers, in certain embodiments, may be the same as those presented above.

In certain embodiments, the temperature of the monomer can be adjusted in the iCVD method. In certain embodiments, the monomer can be heated and delivered to the chamber by a heated mass flow controller. In certain embodiments, the monomer can be heated and delivered to the chamber by a needle valve. In certain embodiments, the monomer is heated at about 30° C., about 35° C., about 40° C., about 45° C., about 50° C., about 55° C., about 60° C., about 65° C., about 70° C., about 75° C., about 80° C., about 85° C., about 90° C., about 95° C., or about 100° C.

In certain embodiments, the flow rate of the initiator can be adjusted in the iCVD method. In certain embodiments, the initiator flow rate is about 100 sccm. In certain embodiments, the initiator flow rate is about 90 sccm. In certain embodiments, the initiator flow rate is about 80 sccm. In certain embodiments, the initiator flow rate is about 70 sccm. In certain embodiments, the initiator flow rate is about 60 sccm. In certain embodiments, the initiator flow rate is about 50 sccm. In certain embodiments, the initiator flow rate is about 40 sccm. In certain embodiments, the initiator flow rate is about 30 sccm. In certain embodiments, the initiator flow rate is about 20 sccm. In certain embodiments, the initiator flow rate is less than about 100 sccm. In certain embodiments, the initiator flow rate is less than about 90 sccm. In certain embodiments, the initiator flow rate is less than about 80 sccm. In certain embodiments, the initiator flow rate is less than about 70 sccm. In certain embodiments, the initiator flow rate is less than about 60 sccm. In certain embodiments, the initiator flow rate is less than about 50 sccm. In certain embodiments, the initiator flow rate is less than about 40 sccm. In certain embodiments, the initiator flow rate is less than about 30 sccm. In certain embodiments, the initiator flow rate is less than about 20 sccm. In certain embodiments, the initiator flow rate is about 10 sccm. In certain embodiments, the flow rate is less than about 10 sccm. In certain embodiments, the initiator flow rate is about 5 sccm. In certain embodiments, the flow rate is less than about 5 sccm. In certain embodiments, the initiator flow rate is about 3 sccm. In certain embodiments, the flow rate is less than about 3 sccm. In certain embodiments, the initiator flow rate is about 1.5 sccm. In certain embodiments, the flow rate is less than about 1.5 sccm. In certain embodiments, the initiator flow rate is about 0.75 sccm. In certain embodiments, the flow rate is less than about 0.75 sccm. In certain embodiments, the initiator flow rate is about 0.5 sccm. In certain embodiments, the flow rate is less than about 0.5 sccm. In certain embodiments, the initiator flow rate is about 0.4 sccm. In certain embodiments, the flow rate is less than about 0.4 sccm. In certain embodiments, the initiator flow rate is about 0.3 sccm. In certain embodiments, the flow rate is less than about 0.3 sccm. In certain embodiments, the initiator flow rate is about 0.2 sccm. In certain embodiments, the flow rate is less than about 0.2 sccm. In certain embodiments, the initiator flow rate is about 0.1 sccm. In certain embodiments, the flow rate is less than about 0.1 sccm. In certain embodiments, a variety of initiators are useful in iCVD; these initiators are well-known in the art.

In certain embodiments, the carrier gas is an inert gas. In certain embodiments, the carrier gas is nitrogen or argon.

In certain embodiments, the flow rate of the carrier gas can be adjusted in the iCVD method. In certain embodiments, the carrier gas flow rate is about 1000 sccm. In certain embodiments, the carrier gas flow rate is about 900 sccm. In certain embodiments, the carrier gas flow rate is about 800 sccm. In certain embodiments, the carrier gas flow rate is about 700 sccm. In certain embodiments, the carrier gas flow rate is about 600 sccm. In certain embodiments, the carrier gas flow rate is about 500 sccm. In certain embodiments, the carrier gas flow rate is about 400 sccm. In certain embodiments, the carrier gas flow rate is about 300 sccm. In certain embodiments, the carrier gas flow rate is about 200 sccm. In certain embodiments, the carrier gas flow rate is about 100 sccm. In certain embodiments, the carrier gas flow rate is about 90 sccm. In certain embodiments, the carrier gas flow rate is about 80 sccm. In certain embodiments, the carrier gas flow rate is about 70 sccm. In certain embodiments, the carrier gas flow rate is about 60 sccm. In certain embodiments, the carrier gas flow rate is about 50 sccm. In certain embodiments, the carrier gas flow rate is about 40 sccm. In certain embodiments, the carrier gas flow rate is about 30 sccm. In certain embodiments, the carrier gas flow rate is about 20 sccm. In certain embodiments, the carrier gas flow rate is less than about 1000 sccm. In certain embodiments, the carrier gas flow rate is less than about 900 sccm. In certain embodiments, the carrier gas flow rate is less than about 800 sccm. In certain embodiments, the carrier gas flow rate is less than about 700 sccm. In certain embodiments, the carrier gas flow rate is less than about 600 sccm. In certain embodiments, the carrier gas flow rate is less than about 500 sccm. In certain embodiments, the carrier gas flow rate is less than about 400 sccm. In certain embodiments, the carrier gas flow rate is less than about 300 sccm. In certain embodiments, the carrier gas flow rate is less than about 200 sccm. In certain embodiments, the carrier gas flow rate is less than about 100 sccm. In certain embodiments, the carrier gas flow rate is less than about 90 sccm. In certain embodiments, the carrier gas flow rate is less than about 80 sccm. In certain embodiments, the carrier gas flow rate is less than about 70 sccm. In certain embodiments, the carrier gas flow rate is less than about 60 sccm. In certain embodiments, the carrier gas flow rate is less than about 50 sccm. In certain, embodiments the carrier gas flow rate is less than about 40 sccm. In certain embodiments, the carrier gas flow rate is less than about 30 sccm. In certain embodiments, the carrier gas flow rate is less than about 20 sccm. In certain embodiments, the carrier gas flow rate is about 10 sccm. In certain embodiments, the flow rate is less than about 10 sccm. In certain embodiments, the carrier gas flow rate is about 5 sccm. In certain embodiments, the flow rate is less than about 5 sccm. In certain embodiments, the carrier gas flow rate is about 4 sccm. In certain embodiments, the flow rate is less than about 4 sccm. In certain embodiments, the carrier gas flow rate is about 3 sccm. In certain embodiments, the flow rate is less than about 3 sccm. In certain embodiments, the carrier gas flow rate is about 2 sccm. In certain embodiments, the flow rate is less than about 2 sccm. In certain embodiments, the carrier gas flow rate is about 1 sccm. In certain embodiments, the flow rate is less than about 1 sccm.

In certain embodiments, the temperature of the filament can be adjusted in the iCVD method. In certain embodiments, the temperature of the filament is about 350° C. In certain embodiments, the temperature of the filament is about 300° C. In certain embodiments, the temperature of the filament is about 250° C. In certain embodiments, the temperature of the filament is about 245° C. In certain embodiments, the temperature of the filament is about 235° C. In certain embodiments, the temperature of the filament is about 225° C. In certain embodiments, the temperature of the filament is about 200° C. In certain embodiments, the temperature of the filament is about 150° C. In certain embodiments, the temperature of the filament is about 100° C.

In certain embodiments, the filament is from about 0.1 cm to about 20 cm from the substrate stage. In certain embodiments, the filament is about 0.1 cm, about 0.2 cm, about 0.3 cm, about 0.4 cm, about 0.5 cm, about 0.6 cm, about 0.7 cm, about 0.8 cm, about 0.9 cm, about 1.0 cm, about 1.1 cm, about 1.2 cm, about 1.3 cm, about 1.4 cm, about 1.5 cm, about 1.6 cm, about 1.7 cm, about 1.8 cm, about 1.9 cm, about 2.0 cm, about 2.1 cm, about 2.2 cm, about 2.3 cm, about 2.4 cm, about 2.5 cm, about 3.0 cm, about 3.5 cm, about 4.0 cm, about 4.5 cm, about 5.0 cm, about 5.5 cm, about 6.0 cm, about 6.5 cm, about 7.0 cm, about 7.5 cm, about 8.0 cm, about 8.5 cm, about 9.0 cm, about 9.5 cm, about 10 cm, about 11 cm, about 12 cm, about 13 cm, about 14 cm, about 15 cm, about 16 cm, about 17 cm, about 18 cm, about 19 cm, or about 20 cm from the substrate stage. In certain embodiments, the filament is about 1.4 cm from the substrate stage.

In certain embodiments, the filament is oriented in any orientation with respect to the substrate stage or the chamber. In certain embodiments, the filament is oriented above the substrate stage, below the substrate stage, or beside the substrate stage.

In certain embodiments, the iCVD coating process can take place at a range of temperatures of the substrate stage. In certain embodiments, the temperature of the substrate stage is ambient temperature. In certain embodiments, the temperature of the substrate stage is about 20° C.; in yet other embodiments the temperature of the substrate stage is between about 10° C. and about 100° C., or between about 0° C. and about 25° C. In certain embodiments said temperature of the substrate stage is controlled by water.

In certain embodiments, the rate of polymer deposition is about 1 micron/minute. In certain embodiments, the rate of polymer deposition is between about 1 micron/minute and about 50 nm/minute. In certain embodiments, the rate of polymer deposition is between about 10 micron/minute and about 50 nm/minute. In certain embodiments, the rate of polymer deposition is between about 100 micron/minute and about 50 nm/minute. In certain embodiments, the rate of polymer deposition is between about 1 nm/minute and about 50 nm/minute. In certain embodiments, the rate of polymer deposition is between about 10 nm/minute and about 50 nm/minute. In certain embodiments, the rate of polymer deposition is between about 10 nm/minute and about 25 nm/minute.

In certain embodiments, pyridine repeat units in films deposited by iCVD are subject to post-deposition functionalization by 3-BPA or PS and converted to zwitterionic structures, which are fouling resistant. In certain embodiments, the antifouling coatings prepared by a solventless procedure are useful in the water desalination industry. In certain embodiments, the films are applied to reverse osmosis (RO) desalination membranes. In certain embodiments, the salt-rejection properties of the RO membranes remain the same after the modification, indicating this mild process does not affect the extremely delicate semipermeable layer. In certain embodiments, permeability to water is affected only slightly by the coating. In certain embodiments, tunable crosslinking density gives rise to adjustable water permeability.

Polymers of the Invention

In certain embodiments, the invention relates to a polymer, comprising a plurality of first repeat units, and a plurality of second repeat units; wherein
the first repeat unit is represented by Formula IA or Formula IIA:

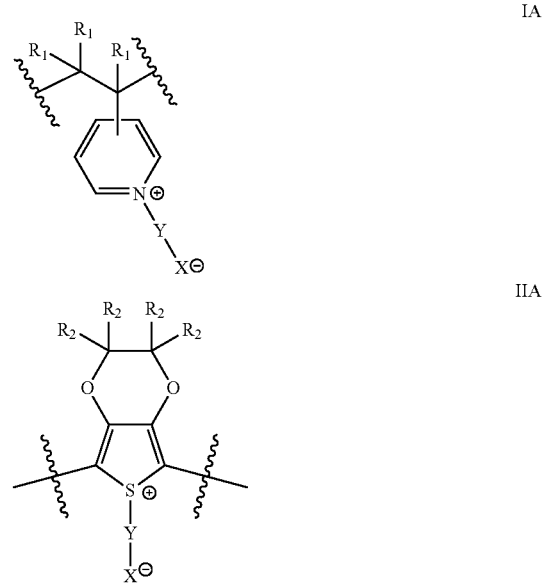

wherein, independently for each occurrence,
$R_1$ is H, alkyl, halo, hydroxy, amino, nitro, or cyano;
$R_2$ is H, alkyl, halo, nitro, or cyano;
Y is a linker that does not comprise an amide bond, an ester bond, or an ether bond; and
$X^\ominus$ is $-SO_3^\ominus$ or $-COO^\ominus$; and
the second repeat unit is represented by Formula IB or Formula IIB:

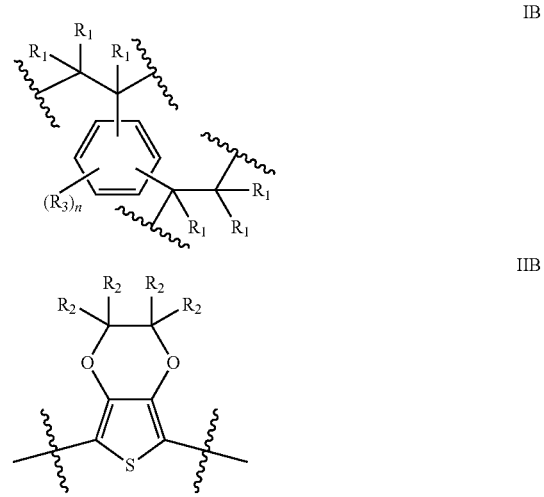

wherein, independently for each occurrence, $R_1$ is H, alkyl, halo, hydroxy, amino, nitro, or cyano;

$R_2$ is H, alkyl, halo, nitro, or cyano;

$R_3$ is alkyl, halo, nitro, or cyano; and n is 0-4.

In certain embodiments, the first repeat unit is represented by Formula IA. In certain embodiments, the first repeat unit is represented by Formula IIA. In certain embodiments, the second repeat unit is represented by Formula IB. In certain embodiments, the second repeat unit is represented by Formula IIB. In certain embodiments, the first repeat unit is represented by Formula IA; and the second repeat unit is represented by Formula IB. In other embodiments, the first repeat unit is represented by Formula IB; and the second repeat unit is represented by Formula IIB.

In certain embodiments, $R_1$ is H.

In certain embodiments, $R_2$ is H.

In certain embodiments, n is 0.

In certain embodiments, $X^\ominus$ is $-SO_3^\ominus$.

In a more embodiment, the first repeat unit is zwitterionic 4-VP; and the second repeat unit is vinyl benzene. In another embodiment, the first repeat unit is zwitterionic EDOT; and the second repeat unit is EDOT.

In certain embodiments, the ratio of first repeat units to second repeat units is about 0.8:0.2. In other embodiments, the ratio of first repeat units to second repeat units is about 2:1.

In certain embodiments, the polymer is PEDOT.

Compositions of the Invention

In certain embodiments, the invention relates to a composition, wherein the composition comprises a substrate and a coating material, wherein the coating material comprises any one of the aforementioned polymers.

In certain embodiments, the invention relates to any one of the aforementioned compositions, wherein coating material consists essentially of any one of the aforementioned polymers.

In certain embodiments, the invention relates to any one of the aforementioned compositions, wherein the thickness of the coating material is from about 10 nm to about 1500 nm. In certain embodiments, the invention relates to any one of the aforementioned compositions, wherein the thickness of the coating material is about 10 nm, about 20 nm, about 30 nm, about 40 nm, about 50 nm, about 60 nm, about 70 nm, about 80 nm, about 90 nm, about 100 nm, about 125 nm, about 150 nm, about 175 nm, about 200 nm, about 225 nm, about 250 nm, about 275 nm, about 300 nm, about 325 nm, about 350 nm, about 375 nm, about 400 nm, about 425 nm, about 450 nm, about 475 nm, about 500 nm, about 525 nm, about 550 nm, about 575 nm, about 600 nm, about 625 nm, about 650 nm, about 675 nm, about 700 nm, about 725 nm, about 750 nm, about 775 nm, about 800 nm, about, 825 nm, about 850 nm, about 875 nm, about 900 nm, about 1000 nm, about 1100 nm, about 1200 nm, about 1300 nm, about 1400 nm, or about 1500 nm.

In certain embodiments, the invention relates to any one of the aforementioned compositions, wherein the substrate is homogeneous.

In certain embodiments, the invention relates to any one of the aforementioned compositions, wherein the substrate is heterogeneous.

In certain embodiments, the invention relates to any one of the aforementioned compositions, wherein the substrate is planar or non-planar.

In certain embodiments, the invention relates to any one of the aforementioned compositions, wherein the substrate is porous.

In certain embodiments, the invention relates to any one of the aforementioned compositions, wherein the substrate comprises a polysulfone, a polyimide, or a polyamide.

In certain embodiments, the invention relates to any one of the aforementioned compositions, wherein the substrate comprises a polyamide.

In certain embodiments, the invention relates to any one of the aforementioned compositions, wherein the surface of the substrate is concave or convex.

In certain embodiments, the invention relates to any one of the aforementioned compositions, wherein the substrate is a membrane.

In certain embodiments, the invention relates to any one of the aforementioned compositions, wherein the substrate is an RO membrane.

In certain embodiments, the invention relates to any one of the aforementioned compositions, wherein the substrate is a medical device.

In certain embodiments, the invention relates to any one of the aforementioned compositions, wherein the substrate is a surface of a hull of a ship, wherein said surface is exposed to water.

In certain embodiments, the invention relates to any one of the aforementioned compositions, wherein the substrate is a surface of an object exposed to water, wherein said surface is exposed to said water.

In certain embodiments, the invention relates to any one of the aforementioned compositions, wherein the substrate is a surface in a hospital operating theater.

In certain embodiments, the invention relates to any one of the aforementioned compositions, wherein the substrate is a surface of a floor in a hospital.

In certain embodiments, the invention relates to any one of the aforementioned compositions, wherein the substrate is a surface of a laboratory bench.

In certain embodiments, the invention relates to any one of the aforementioned compositions, wherein the substrate is a wooden surface.

In certain embodiments, the invention relates to any one of the aforementioned compositions, wherein the substrate is a surface of a food processing device.

In certain embodiments, the invention relates to any one of the aforementioned compositions, wherein the substrate is a surface on which food is prepared.

In certain embodiments, the invention relates to any one of the aforementioned compositions, wherein the substrate is a porcelain surface.

In certain embodiments, the invention relates to any one of the aforementioned compositions, wherein the substrate is a plastic surface.

In certain embodiments, the invention relates to any one of the aforementioned compositions, wherein the static contact angle is from about 20° to about 50°. In certain embodiments, the invention relates to any one of the aforementioned compositions, wherein the static contact angle is about 25°, about 26°, about 27°, about 28°, about 29°, about 30°, about 31°, about 32°, about 33°, about 34°, about 35°, about 36°, about 37°, about 38°, about 39°, about 40°, about 41°, about 42°, about 43°, about 44°, about 45°, about 46°, about 47°, or about 48°. In certain embodiments, the invention relates to any one of the aforementioned compositions, wherein the static contact angle is measured at about 25° C. and about 1 atm.

In certain embodiments, the invention relates to any one of the aforementioned compositions, wherein the receding water contact angle is from about 15° to about 25° at about 25° C. and about 1 atm. In certain embodiments, the receding water contact angle is about 20°.

In certain embodiments, he invention relates to any one of the aforementioned compositions, wherein the advancing water contact angle is from about 40° to about 60° at about 25° C. and about 1 atm. In certain embodiments, the advancing water contact angle is about 45°. In certain embodiments, the advancing water contact angle is about 57°.

In certain embodiments, the invention relates to any one of the aforementioned compositions, wherein, upon exposure to a biomolecule, an area of the composition adsorbs less than about 80%, less than about 70%, less than about 60%, less than about 50%, less than about 40%, less than about 30%, less than about 20%, or less than about 10% by mass of the biomolecule, as compared to the mass of the biomolecule adsorbed by the same area of the substrate alone, without the coating material, under identical conditions. In certain embodiments, the biomolecule is a protein or an organism. In certain embodiments, the biomolecule is BSA.

In certain embodiments, the invention relates to any one of the aforementioned compositions, wherein, upon exposure to a quantity of an organism, an area of the composition adsorbs less than about 50%, less than about 40%, less than about 30%, less than about 20%, less than about 10%, less than about 5%, less than about 4%, less than about 3%, less than about 2%, or less than about 1% by number of the organism, as compared to the number of organisms adsorbed by the same area of the substrate alone, without the coating material, under identical conditions.

In certain embodiments, the invention relates to any one of the aforementioned compositions, wherein the permeability of the composition is about 50%, about 55%, about 60%, about 65%, about 70%, about 75%, about 80%, about 85%, about 90%, about 95%, or about 99% of the permeability of the substrate alone, without the coating material, under identical conditions.

In certain embodiments, the invention relates to any one of the aforementioned compositions, wherein the composition rejects about 70%, about 75%, about 80%, about 85%, about 90%, about 91%, about 92%, about 93%, about 94%, about 95%, about 96%, about 97%, about 98%, or about 99% of the salt in a feed solution. In certain embodiments, the invention relates to any one of the aforementioned compositions, wherein the feed solution comprises salt up to about 1000 ppm, about 1500 ppm, about 2000 ppm, about 2500 ppm, about 3000 ppm, 4000 ppm, 5000 ppm, 6000 ppm, 7000 ppm, 8000 ppm, 9000 ppm, about 10,000 ppm, about 15,000 ppm, about 20,000 ppm, about 25,000 ppm, about 30,000 ppm, or about 35,000 ppm. In certain embodiments, the invention relates to any one of the aforementioned compositions, wherein the salt in the feed solution is sodium chloride.

In certain embodiments, the invention relates to any one of the aforementioned compositions, wherein the coating material is not substantially soluble in ethanol.

In certain embodiments, the invention relates to any one of the aforementioned compositions, wherein the composition displays antifouling properties.

In certain embodiments, the invention relates to any one of the aforementioned compositions, wherein the composition maintains high flux after the coating process.

In certain embodiments, the invention relates to any one of the aforementioned compositions, wherein the composition maintains high salt rejection after the coating process.

In certain embodiments, the invention relates to any one of the aforementioned compositions, wherein the composition displays good coating stability in long-term use.

Another aspect of the invention relates to the composition obtained by the process of any one of methods discussed below.

Methods of the Invention

In certain embodiments, the invention relates to any one of the aforementioned methods, further comprising the steps of: providing a deposition chamber; and adding to the deposition chamber an initiator. The initiator may be any compound that decomposes to form free radicals. The initiator may be AIBN, an alkyl peroxide (e.g., tert-amyl peroxide or tert-butyl peroxide), or a dialkyl peroxide (e.g., di-tert-amyl peroxide or di-tert-butyl peroxide), triethylamine, tert-butyl peroxy benzoate, benzophenone, or 2,2'-azobis(2-methylpropane)

In certain embodiments, the invention relates to any one of the aforementioned methods, wherein the first period of time is about 2 s to about 10 min. In certain embodiments, the invention relates to any one of the aforementioned methods, wherein the first period of time is about 2 s, about 3 s, about 4 s, about 5 s, about 6 s, about 7 s, about 8 s, about 9 s, about 10 s, about 11 s, about 12 s, about 13 s, about 14 s, about 15 s, about 16 s, about 17 s, about 18 s, about 19 s, about 20 s, about 25 s, about 30 s, about 35 s, about 40 s, about 45 s, about 50 s, about 55 s, about 60 s, about 90 s, about 120 s, about 150 s, about 3 min, about 3.5 min, about 4 min, about 4.5 min, about 5 min, about 5.5 min, about 6 min, about 6.5 min, about 7 min, about 7.5 min, about 8 min, about 8.5 min, about 9 min, about 9.5 min, or about 10 min.

In certain embodiments, the invention relates to any one of the aforementioned methods, wherein the first pressure is about 5 mTorr to about 1000 mTorr. In certain embodiments, the invention relates to any one of the aforementioned methods, wherein the first pressure is about 5 mTorr, about 10 mTorr, about 15 mTorr, about 20 mTorr, about 25 mTorr, about 30 mTorr, about 35 mTorr, about 40 mTorr, about 45 mTorr, about 50 mTorr, about 75 mTorr, about 100 mTorr, about 125 mTorr, about 150 mTorr, about 175 mTorr, about 200 mTorr, about 225 mTorr, about 250 mTorr, about 300 mTorr, about 350 mTorr, about 400 mTorr, about 450 mTorr, about 500 mTorr, about 550 mTorr, about 600 mTorr, about 650 mTorr, about 700 mTorr, about 750 mTorr, about 800 mTorr, about 850 mTorr, about 900 mTorr, about 950 mTorr, or about 1000 mTorr.

In certain embodiments, the invention relates to any one of the aforementioned methods, wherein the polymer is deposited onto the conditioned surface.

In certain embodiments, the invention relates to any one of the aforementioned methods, wherein depositing the polymer comprises initiated chemical vapor deposition (iCVD) of the polymer in a deposition chamber.

In certain embodiments, the invention relates to any one of the aforementioned methods, wherein depositing the polymer comprises oxidative chemical vapor deposition (oCVD) of the polymer in a deposition chamber.

In certain embodiments, the invention relates to any one of the aforementioned methods, wherein the deposition rate of the polymer onto the substrate is less than about 30 nm/min. In certain embodiments, the invention relates to any one of the aforementioned methods, wherein the deposition rate of the polymer onto the substrate is about 30 nm/min, about 28 nm/min, about 26 nm/min, about 24 nm/min, about 22 nm/min, about 20 nm/min, about 18 nm/min, about 16 nm/min, about 14 nm/min, about 12 nm/min, about 10 nm/min, about 9 nm/min, about 8 nm/min, about 7 nm/min, about 6 nm/min, about 5 nm/min, about 4 nm/min, about 3 nm/min, about 2 nm/min, or about 1 nm/min.

Applications and Articles of the Invention

In certain embodiments, the invention relates to an article comprising any one of the aforementioned compositions.

In certain embodiments, the invention relates to any one of the aforementioned articles, wherein the article is, or is incorporated into, a water desalination device.

Methods of Use

In certain embodiments, the invention relates to a method comprising contacting, at a first flow rate, a first sample of water with any one of the aforementioned compositions or articles, thereby producing a second sample of water, wherein the first sample of water comprises a first concentration or first quantity of a substance; the second sample of water comprises a second concentration or second quantity of the substance; and the second concentration or second quantity is substantially lower than the first concentration or first quantity.

In certain embodiments, the invention relates to any one of the aforementioned methods, wherein the second concentration or second quantity is about 0.

In certain embodiments, the invention relates to any one of the aforementioned methods, wherein the method is a method of water desalination. In certain embodiments, the invention relates to any one of the aforementioned methods, wherein the substance is a salt (e.g., sodium chloride). In certain embodiments, the invention relates to any one of the aforementioned methods, wherein the substance is a salt (e.g., sodium chloride); and the second quantity or second concentration is less than 4% of the first quantity or first concentration. In certain embodiments, the invention relates to any one of the aforementioned methods, wherein the substance is a salt (e.g., sodium chloride); and the second quantity or second concentration is about 3%, about 2%, or about 1% of the first quantity or first concentration.

In certain embodiments, the invention relates to any one of the aforementioned methods, wherein the method is a method of separating oil and water. In certain embodiments, the invention relates to any one of the aforementioned methods, wherein the substance is an oil.

Methods of Manufacture

In certain embodiments, the invention relates to a method of coating a surface of a substrate, comprising the steps of:
providing a substrate;
exposing a surface of the substrate to plasma for a first period of time at a first pressure, thereby producing a conditioned surface of the substrate;
contacting the conditioned surface of the substrate with a polymer comprising a first repeat unit and a second repeat unit, wherein
the first repeat unit is represented by Formula IC or Formula IIC:

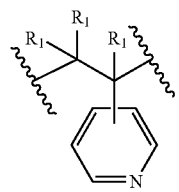

IC

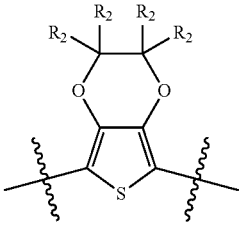

IIC wherein, independently for each occurrence,
$R_1$ is H, alkyl, halo, hydroxy, amino, nitro, or cyano;
$R_2$ is H, alkyl, halo, nitro, or cyano;
Y is a linker that does not comprise an amide bond, an ester bond, or an ether bond; and
the second repeat unit is represented by Formula ID or is absent:

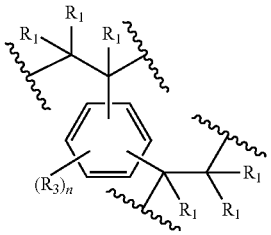

ID wherein, independently for each occurrence,
$R_1$ is H, alkyl, halo, hydroxy, amino, nitro, or cyano;
$R_2$ is H, alkyl, halo, nitro, or cyano;
$R_3$ is alkyl, halo, nitro, or cyano; and
n is 0-4,
thereby producing a polymer-coated substrate.

In certain embodiments, the first repeat unit is represented by Formula IC. In certain embodiments, the first repeat unit is represented by Formula IIC.

In certain embodiments, the second repeat unit is represented by Formula ID. In certain embodiments, the second repeat unit is absent.

In certain embodiments, the first repeat unit is represented by Formula IC; and the second repeat unit is represented by ID. In other embodiments, the first repeat unit is represented by Formula IIC; and the second repeat unit is absent.

In certain embodiments, $R_1$ is H.

In certain embodiments, $R_2$ is H.

In certain embodiments, n is 0.

In certain embodiments, the method further comprises the step of: contacting the polymer-coated substrate with a zwitterionic precursor.

In certain embodiments, the zwitterionic precursor is 3-bromopropionic acid, and m is 1, 2, or 3.

Definitions

Unless otherwise defined herein, scientific and technical terms used in this application shall have the meanings that are commonly understood by those of ordinary skill in the art. Generally, nomenclature used in connection with, and techniques of, chemistry, cell and tissue culture, molecular biology, cell and cancer biology, neurobiology, neurochemistry, virology, immunology, microbiology, pharmacology, genetics and protein and nucleic acid chemistry, described herein, are those well known and commonly used in the art.

The methods and techniques of the present disclosure are generally performed, unless otherwise indicated, according to conventional methods well known in the art and as described in various general and more specific references that are cited and discussed throughout this specification. See, e.g. "Principles of Neural Science", McGraw-Hill Medical, New York, N.Y. (2000); Motulsky, "Intuitive Biostatistics", Oxford University Press, Inc. (1995); Lodish et al., "Molecular Cell Biology, 4th ed.", W. H. Freeman & Co., New York (2000); Griffiths et al., "Introduction to Genetic Analysis, 7th ed.", W. H. Freeman & Co., N.Y. (1999); and Gilbert et al., "Developmental Biology, 6th ed.", Sinauer Associates, Inc., Sunderland, Mass. (2000).

Chemistry terms used herein, unless otherwise defined herein, are used according to conventional usage in the art, as exemplified by "The McGraw-Hill Dictionary of Chemical Terms", Parker S., Ed., McGraw-Hill, San Francisco, Calif. (1985).

All of the above, and any other publications, patents and published patent applications referred to in this application are specifically incorporated by reference herein. In case of conflict, the present specification, including its specific definitions, will control.

As used herein, the terms "optional" or "optionally" mean that the subsequently described event or circumstance may occur or may not occur, and that the description includes instances where the event or circumstance occurs as well as instances in which it does not. For example, "optionally substituted alkyl" refers to the alkyl may be substituted as well as where the alkyl is not substituted.

It is understood that substituents and substitution patterns on the compounds of the present invention can be selected by one of ordinary skilled person in the art to result chemically stable compounds which can be readily synthesized by techniques known in the art, as well as those methods set forth below, from readily available starting materials. If a substituent is itself substituted with more than one group, it is understood that these multiple groups may be on the same carbon or on different carbons, so long as a stable structure results.

As used herein, the term "optionally substituted" refers to the replacement of one to six hydrogen radicals in a given structure with the radical of a specified substituent including, but not limited to: hydroxyl, hydroxyalkyl, alkoxy, halogen, alkyl, nitro, silyl, acyl, acyloxy, aryl, cycloalkyl, heterocyclyl, amino, aminoalkyl, cyano, haloalkyl, haloalkoxy, —OCO—CH$_2$—O-alkyl, —OP(O)(O-alkyl)$_2$ or —CH$_2$—OP(O)(O-alkyl)$_2$. Preferably, "optionally substituted" refers to the replacement of one to four hydrogen radicals in a given structure with the substituents mentioned above. More preferably, one to three hydrogen radicals are replaced by the substituents as mentioned above. It is understood that the substituent can be further substituted.

As used herein, the term "alkyl" refers to saturated aliphatic groups, including but not limited to C$_1$-C$_{10}$ straight-chain alkyl groups or C$_1$-C$_{10}$ branched-chain alkyl groups. Preferably, the "alkyl" group refers to C$_1$-C$_6$ straight-chain alkyl groups or C$_1$-C$_6$ branched-chain alkyl groups. Most preferably, the "alkyl" group refers to C$_1$-C$_4$ straight-chain alkyl groups or C$_1$-C$_4$ branched-chain alkyl groups. Examples of "alkyl" include, but are not limited to, methyl, ethyl, 1-propyl, 2-propyl, n-butyl, sec-butyl, tert-butyl, 1-pentyl, 2-pentyl, 3-pentyl, neo-pentyl, 1-hexyl, 2-hexyl, 3-hexyl, 1-heptyl, 2-heptyl, 3-heptyl, 4-heptyl, 1-octyl, 2-octyl, 3-octyl or 4-octyl and the like. The "alkyl" group may be optionally substituted.

The term "acyl" is art-recognized and refers to a group represented by the general formula hydrocarbylC(O)—, preferably alkylC(O)—.

The term "acylamino" is art-recognized and refers to an amino group substituted with an acyl group and may be represented, for example, by the formula hydrocarbylC(O)NH—.

The term "acyloxy" is art-recognized and refers to a group represented by the general formula hydrocarbylC(O)O—, preferably alkylC(O)O—.

The term "alkoxy" refers to an alkyl group having an oxygen attached thereto. Representative alkoxy groups include methoxy, ethoxy, propoxy, tert-butoxy and the like.

The term "alkoxyalkyl" refers to an alkyl group substituted with an alkoxy group and may be represented by the general formula alkyl-O-alkyl.

The term "alkyl" refers to saturated aliphatic groups, including straight-chain alkyl groups, branched-chain alkyl groups, cycloalkyl (alicyclic) groups, alkyl-substituted cycloalkyl groups, and cycloalkyl-substituted alkyl groups. In some embodiments, a straight chain or branched chain alkyl has 30 or fewer carbon atoms in its backbone (e.g., C$_{1-30}$ for straight chains, C$_{3-30}$ for branched chains), and more preferably 20 or fewer.

Moreover, the term "alkyl" as used throughout the specification, examples, and claims is intended to include both unsubstituted and substituted alkyl groups, the latter of which refers to alkyl moieties having substituents replacing a hydrogen on one or more carbons of the hydrocarbon backbone, including haloalkyl groups such as trifluoromethyl and 2,2,2-trifluoroethyl, etc.

The term "C$_{x-y}$" or "C$_x$-C$_y$", when used in conjunction with a chemical moiety, such as, acyl, acyloxy, alkyl, alkenyl, alkynyl, or alkoxy is meant to include groups that contain from x to y carbons in the chain. C$_0$alkyl indicates a hydrogen where the group is in a terminal position, a bond if internal. A C$_{1-6}$alkyl group, for example, contains from one to six carbon atoms in the chain.

The term "alkylamino", as used herein, refers to an amino group substituted with at least one alkyl group.

The term "alkylthio", as used herein, refers to a thiol group substituted with an alkyl group and may be represented by the general formula alkylS—.

The term "amide", as used herein, refers to a group

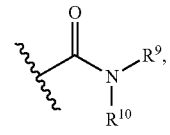

wherein R$^9$ and R$^{10}$ each independently represent a hydrogen or hydrocarbyl group, or R$^9$ and R$^{10}$ taken together with the N atom to which they are attached complete a heterocycle having from 4 to 8 atoms in the ring structure.

The terms "amine" and "amino" are art-recognized and refer to both unsubstituted and substituted amines and salts thereof, e.g., a moiety that can be represented by

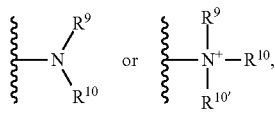

wherein $R^9$, $R^{10}$, and $R^{10'}$ each independently represent a hydrogen or a hydrocarbyl group, or $R^9$ and $R^{10}$ taken together with the N atom to which they are attached complete a heterocycle having from 4 to 8 atoms in the ring structure.

The term "aminoalkyl", as used herein, refers to an alkyl group substituted with an amino group.

The term "aralkyl", as used herein, refers to an alkyl group substituted with an aryl group.

The term "aryl" as used herein include substituted or unsubstituted single-ring aromatic groups in which each atom of the ring is carbon. Preferably the ring is a 5- to 7-membered ring, more preferably a 6-membered ring. The term "aryl" also includes polycyclic ring systems having two or more cyclic rings in which two or more carbons are common to two adjoining rings wherein at least one of the rings is aromatic, e.g., the other cyclic rings can be cycloalkyls, cycloalkenyls, cycloalkynyls, aryls, heteroaryls, and/or heterocyclyls. Aryl groups include benzene, naphthalene, phenanthrene, phenol, aniline, and the like.

The term "carbamate" is art-recognized and refers to a group

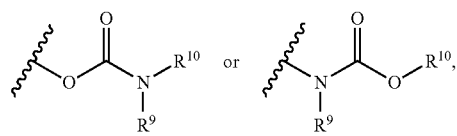

wherein $R^9$ and $R^{10}$ independently represent hydrogen or a hydrocarbyl group.

The term "carbocyclylalkyl", as used herein, refers to an alkyl group substituted with a carbocycle group.

The terms "carbocycle", "carbocyclyl", and "carbocyclic", as used herein, refers to a non-aromatic saturated or unsaturated ring in which each atom of the ring is carbon. Preferably a carbocycle ring contains from 3 to 10 atoms, more preferably from 5 to 7 atoms.

The term "carbocyclylalkyl", as used herein, refers to an alkyl group substituted with a carbocycle group.

The term "carbonate" is art-recognized and refers to a group —OCO$_2$—.

The term "carboxy", as used herein, refers to a group represented by the formula —CO$_2$H.

The term "ester", as used herein, refers to a group —C(O)OR$^9$ wherein R$^9$ represents a hydrocarbyl group.

The term "ether", as used herein, refers to a hydrocarbyl group linked through an oxygen to another hydrocarbyl group. Accordingly, an ether substituent of a hydrocarbyl group may be hydrocarbyl-O—. Ethers may be either symmetrical or unsymmetrical. Examples of ethers include, but are not limited to, heterocycle-O-heterocycle and aryl-O-heterocycle. Ethers include "alkoxyalkyl" groups, which may be represented by the general formula alkyl-O-alkyl.

The terms "halo" and "halogen" as used herein means halogen and includes chloro, fluoro, bromo, and iodo.

The terms "hetaralkyl" and "heteroaralkyl", as used herein, refers to an alkyl group substituted with a hetaryl group.

The terms "heteroaryl" and "hetaryl" include substituted or unsubstituted aromatic single ring structures, preferably 5- to 7-membered rings, more preferably 5- to 6-membered rings, whose ring structures include at least one heteroatom, preferably one to four heteroatoms, more preferably one or two heteroatoms. The terms "heteroaryl" and "hetaryl" also include polycyclic ring systems having two or more cyclic rings in which two or more carbons are common to two adjoining rings wherein at least one of the rings is heteroaromatic, e.g., the other cyclic rings can be cycloalkyls, cycloalkenyls, cycloalkynyls, aryls, heteroaryls, and/or heterocyclyls. Heteroaryl groups include, for example, pyrrole, furan, thiophene, imidazole, oxazole, thiazole, pyrazole, pyridine, pyrazine, pyridazine, and pyrimidine, and the like.

The term "heteroatom" as used herein means an atom of any element other than carbon or hydrogen. Preferred heteroatoms are nitrogen, oxygen, and sulfur.

The term "heterocyclylalkyl", as used herein, refers to an alkyl group substituted with a heterocycle group.

The terms "heterocyclyl", "heterocycle", and "heterocyclic" refer to substituted or unsubstituted non-aromatic ring structures, preferably 3- to 10-membered rings, more preferably 3- to 7-membered rings, whose ring structures include at least one heteroatom, preferably one to four heteroatoms, more preferably one or two heteroatoms. The terms "heterocyclyl" and "heterocyclic" also include polycyclic ring systems having two or more cyclic rings in which two or more carbons are common to two adjoining rings wherein at least one of the rings is heterocyclic, e.g., the other cyclic rings can be cycloalkyls, cycloalkenyls, cycloalkynyls, aryls, heteroaryls, and/or heterocyclyls. Heterocyclyl groups include, for example, piperidine, piperazine, pyrrolidine, morpholine, lactones, lactams, and the like.

The term "hydrocarbyl", as used herein, refers to a group that is bonded through a carbon atom that does not have a =O or =S substituent, and typically has at least one carbon-hydrogen bond and a primarily carbon backbone, but may optionally include heteroatoms. Thus, groups like methyl, ethoxyethyl, 2-pyridyl, and even trifluoromethyl are considered to be hydrocarbyl for the purposes of this application, but substituents such as acetyl (which has a =O substituent on the linking carbon) and ethoxy (which is linked through oxygen, not carbon) are not. Hydrocarbyl groups include, but are not limited to, aryl, heteroaryl, carbocycle, heterocycle, alkyl, alkenyl, alkynyl, and combinations thereof.

The term "hydroxyalkyl", as used herein, refers to an alkyl group substituted with a hydroxy group.

The term "lower" when used in conjunction with a chemical moiety, such as, acyl, acyloxy, alkyl, alkenyl, alkynyl, or alkoxy is meant to include groups where there are ten or fewer atoms in the substituent, preferably six or fewer. A "lower alkyl", for example, refers to an alkyl group that contains ten or fewer carbon atoms, preferably six or fewer. In certain embodiments, acyl, acyloxy, alkyl, alkenyl, alkynyl, or alkoxy substituents defined herein are respectively lower acyl, lower acyloxy, lower alkyl, lower alkenyl, lower alkynyl, or lower alkoxy, whether they appear alone or in combination with other substituents, such as in the recitations hydroxyalkyl and aralkyl (in which case, for example, the atoms within the aryl group are not counted when counting the carbon atoms in the alkyl substituent).

The terms "polycyclyl", "polycycle", and "polycyclic" refer to two or more rings (e.g., cycloalkyls, cycloalkenyls, cycloalkynyls, aryls, heteroaryls, and/or heterocyclyls) in which two or more atoms are common to two adjoining rings, e.g., the rings are "fused rings". Each of the rings of the polycycle can be substituted or unsubstituted. In certain embodiments, each ring of the polycycle contains from 3 to 10 atoms in the ring, preferably from 5 to 7.

The term "sulfate" is art-recognized and refers to the group —OSO₃H, or a pharmaceutically acceptable salt thereof.

The term "sulfonamide" is art-recognized and refers to the group represented by the general formulae

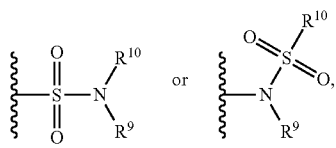

wherein $R^9$ and $R^{10}$ independently represents hydrogen or hydrocarbyl.

The term "sulfoxide" is art-recognized and refers to the group —S(O)—.

The term "sulfonate" is art-recognized and refers to the group SO₃H, or a pharmaceutically acceptable salt thereof.

The term "sulfone" is art-recognized and refers to the group —S(O)₂—.

The term "substituted" refers to moieties having substituents replacing a hydrogen on one or more carbons of the backbone. It will be understood that "substitution" or "substituted with" includes the implicit proviso that such substitution is in accordance with permitted valence of the substituted atom and the substituent, and that the substitution results in a stable compound, e.g., which does not spontaneously undergo transformation such as by rearrangement, cyclization, elimination, etc. As used herein, the term "substituted" is contemplated to include all permissible substituents of organic compounds. In a broad aspect, the permissible substituents include acyclic and cyclic, branched and unbranched, carbocyclic and heterocyclic, aromatic and non-aromatic substituents of organic compounds. The permissible substituents can be one or more and the same or different for appropriate organic compounds. For purposes of this invention, the heteroatoms such as nitrogen may have hydrogen substituents and/or any permissible substituents of organic compounds described herein which satisfy the valences of the heteroatoms. Substituents can include any substituents described herein, for example, a halogen, a hydroxyl, a carbonyl (such as a carboxyl, an alkoxycarbonyl, a formyl, or an acyl), a thiocarbonyl (such as a thioester, a thioacetate, or a thioformate), an alkoxyl, a phosphoryl, a phosphate, a phosphonate, a phosphinate, an amino, an amido, an amidine, an imine, a cyano, a nitro, an azido, a sulfhydryl, an alkylthio, a sulfate, a sulfonate, a sulfamoyl, a sulfonamido, a sulfonyl, a heterocyclyl, an aralkyl, or an aromatic or heteroaromatic moiety. It will be understood by those skilled in the art that the moieties substituted on the hydrocarbon chain can themselves be substituted, if appropriate.

The term "thioalkyl", as used herein, refers to an alkyl group substituted with a thiol group.

The term "thioester", as used herein, refers to a group —C(O)SR⁹ or —SC(O)R⁹ wherein R⁹ represents a hydrocarbyl.

The term "thioether", as used herein, is equivalent to an ether, wherein the oxygen is replaced with a sulfur.

The term "urea" is art-recognized and may be represented by the general formula

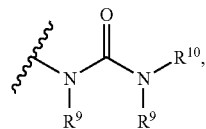

wherein $R^9$ and $R^{10}$ independently represent hydrogen or a hydrocarbyl.

Some of the polymers may exist in tautomeric forms. Such forms, although not explicitly indicated in the formulae described herein, are intended to be included within the scope of the present disclosure.

EXAMPLES

The invention now being generally described, it will be more readily understood by reference to the following examples which are included merely for purposes of illustration of certain aspects and embodiments of the present invention, and are not intended to limit the invention.

Overview

Fouling has been a persistent issue within applications ranging from membrane separation to biomedical implantation. Research to date focuses on fouling resistant coatings, where electrical conductivity is unnecessary. Disclosed herein, we report the synthesis of multifunctional thin films with both fouling-resistance and electrical conductivity for their potential applications in electrolysis based self-cleaning of separation membranes and in the field of bioelectronics. This unique combination of properties results in multifunctional coatings that are a zwitterionic derivative of the intrinsically conductive polymer poly(3,4-ethylenedioxythiophene) (PEDOT) synthesized via oxidative chemical vapor deposition (oCVD). Their fouling resistances are shown to be comparable to known dielectric fouling-resistant surfaces, such as poly(4-vinyl pyridine)-co-divinylbenzene (p4VP-DVB) derived zwitterionic coating, amphiphilic poly(1H,1H,2H,2H-perfluorodecyl acrylate-co-2-hydroxyethyl methacrylate) (pPFDA-HEMA) coating and the glass surface, and are far superior to the fouling resistance of gold or polydimethylsiloxane (PDMS) surfaces. The fouling resistances of seven surfaces are quantitatively characterized by molecular force probe (MFP) analysis. In addition, four-point probe electrical measurements, Fourier Transform Infrared Spectroscopy (FTIR), X-ray photoelectron spectroscopy (XPS), variable angle spectroscopic ellipsometry (VASE), profilometry, water contact angle (WCA) measurements, surface ζ-potential measurements and atomic force microscopy (AFM) were employed to characterize the physiochemical properties and morphology of the different surfaces.

Example 1

Preparation of Exemplary Films of the Disclosure

Synthesis of PEDOT Derived Zwitterionic Films

Figure 1A:
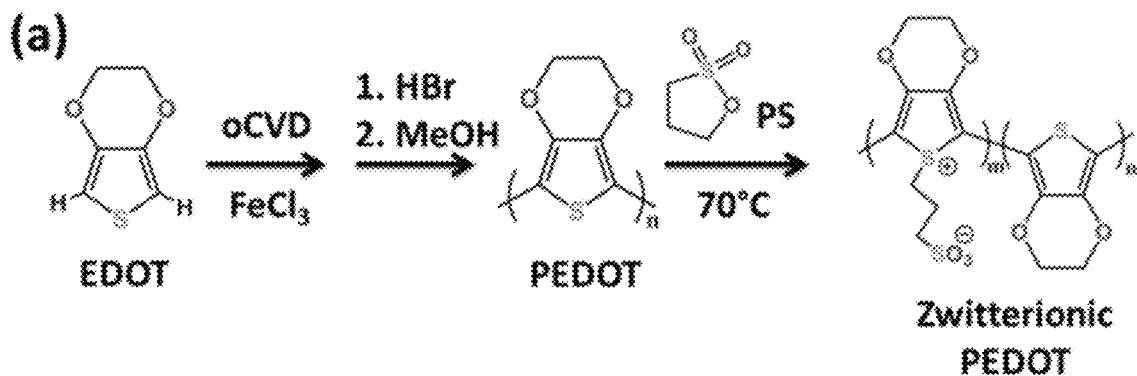
FIG. 1A depicts an exemplary scheme for the synthesis of PEDOT CVD polymer films.

Poly(3,4-ethylenedioxythiophene) (PEDOT) was synthesized via oxidative chemical vapor deposition (oCVD) during which the glass substrates (or silicon substrates) were simultaneously exposed to vapors of 3,4-ethylenedioxythiophene (EDOT) monomer (Sigma Aldrich, 97%) and iron chloride (FeCl3) oxidant (Sigma Aldrich, 99.99%). A schematic is shown in FIG. 1A. The evaporated monomer was delivered at the rate of ~5 sccm into the vacuum chamber, where the oxidant was evaporated from a resistively heated crucible at 100-165° C. The substrate temperature was 140° C. and the chamber pressure during the deposition was kept at ~0.1 mTorr. Following the deposition, the PEDOT films were rinsed in 5 M hydrobromic acid (HBr) (prepared by diluting 48% HBr, Sigma Aldrich, with deionized water) for 20 mins to remove all the residual oxidant, then rinsed in methanol (BDH, ACS grade) and dried in air. PEDOT derived zwitterionic films were obtained by further treating the oCVD synthesized PEDOT films with 1,3-propanesultone (PS, 99%, Sigma Aldrich) vapor at 70° C. in a vacuum chamber for 12 hours (FIG. 1A). Excess 1,3-propanesultone was removed by washing the film with water.

Figure 1B:
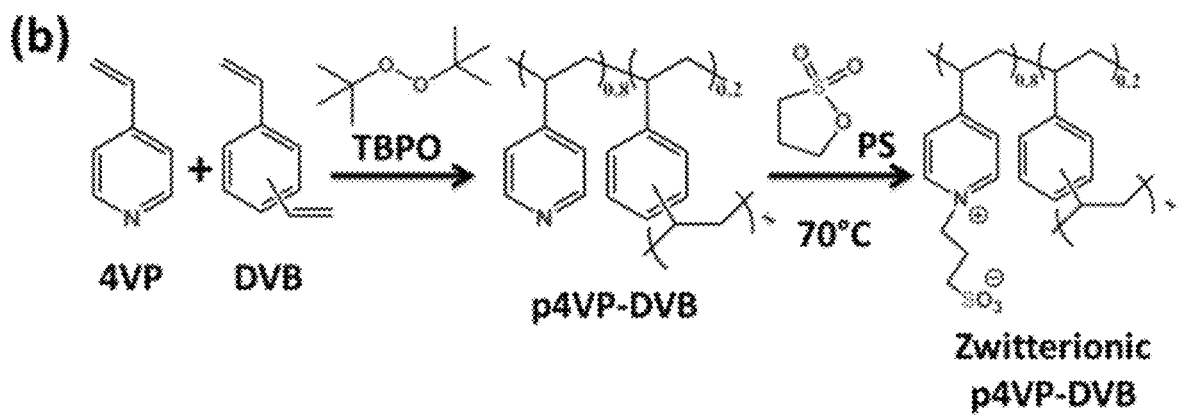
FIG. 1B depicts an exemplary scheme for the synthesis of p4VP-DVB CVD polymer films.
Figure 1C:
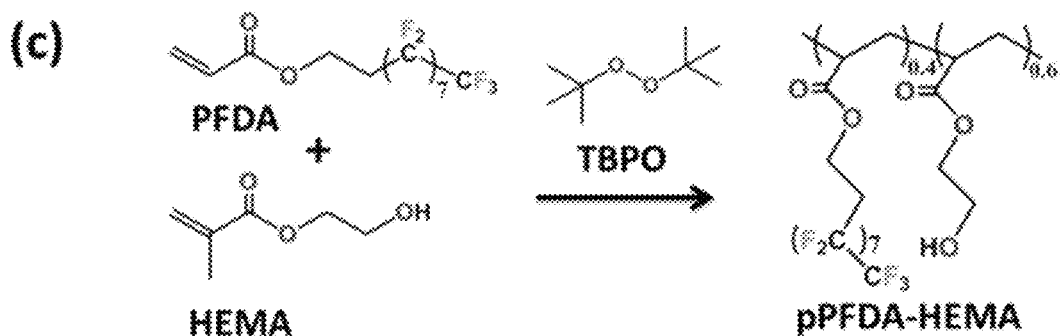
FIG. 1C depicts an exemplary scheme for the synthesis of pFDA-HEMA CVD polymer films.
Figure 11A:
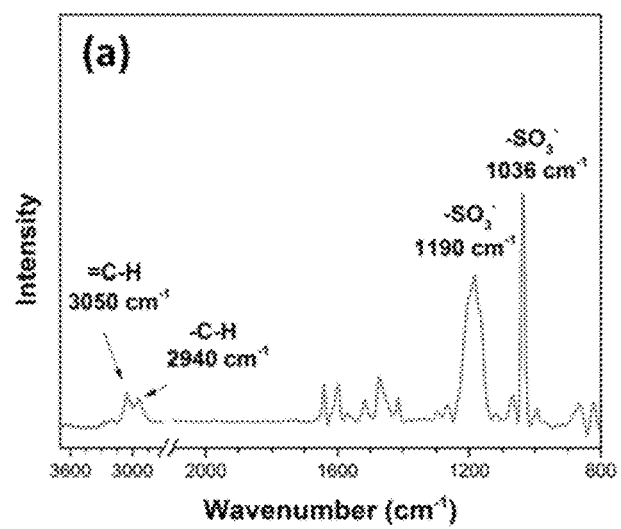
FIG. 11A depicts the FTIR spectra of zwitterionic copolymer poly(4-vinylpyridine)-co-divinylbenzene (4VP-DVB).
Figure 11B:
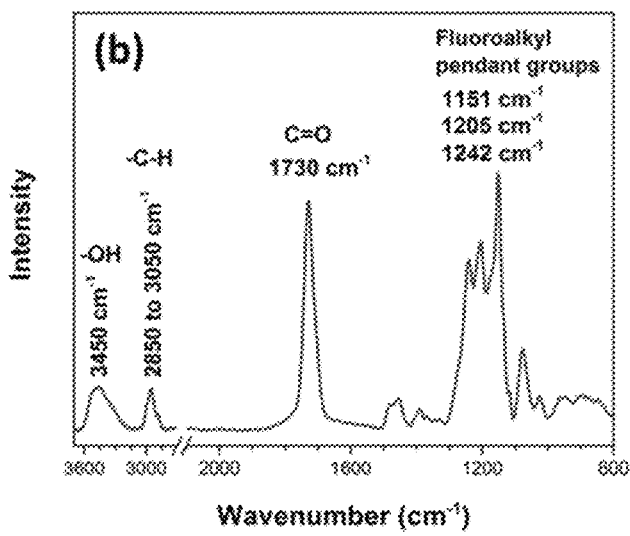
FIG. 11B depicts the FTIR spectra of amphiphilic poly(1H,1H,2H,2H-perfluorodecyl acrylate)-co-(2-hydroxyethyl methacrylate) (PFDA-HEMA).

Synthesis of Poly-4VP-co-DVB Derived Zwitterionic Films and Amphiphilic Poly-PFDA-co-HEMA Initiated chemical vapor deposition (iCVD) technique was employed to deposit both poly(4-vinylpyridine-co-divinylbenzene) (p4VP-DVB) and poly(1H,1H,2H,2H-perfluorodecyl acrylate-co-2-hydroxyethyl methacrylate) (pPFDA-HEMA) on Si wafers (UniversityWafers Inc., Boston, Mass.) using the published procedures in the literature (Schematic shown in FIGS. 1B and 1C). Monomers 4-vinylpyridine (4VP, 95%), divinylbenzene (DVB, 80%), 1H,1H,2H,2H-perfluorodecyl acrylate (PFDA, 97%) and 2-hydroxyethyl methacrylate) (HEMA, 97%) were purchased from Sigma Aldrich without further purification. The ratio of copolymer components was tuned by the feed monomer flow rate. An optimized bulk composition of p4VP-DVB (80% of 4VP) was determined by FTIR spectra using methods discussed previously. Similarly, the PFDA content in pPFDA-HEMA was tuned to 40% for better fouling resistance performances, the refractive indices measured by ellipsometry were employed for composition determination. 1,3-propanesultone (PS, 99%, Sigma Aldrich) was used to convert p4VP-DVB to polyzwitterions (vapor treatment for 12 hours, FIG. 1B). The characteristic FTIR spectra of zwitterionic p4VP-DVB and pPFDA-HEMA are shown in FIGS. 11 and 12.

Example 2

Characterization of Exemplary Films of the Disclosure

Characterization of Physiochemical Properties

Fourier transform infrared spectroscopy (FTIR) (Thermo scientific Nicolet iS50, with a mercury cadmium tellurium (MCT) detector and a moderate intensity attenuator, Thermo Fisher Scientific, Waltham, Mass.) was used for analyzing the chemical composition of CVD synthesized polymeric films and their derivatives. In a typical measurement, a spectrum of CVD polymer coated Si wafer was first collected. The coating was then removed from the Si wafer to obtain a second spectrum of the bare Si wafer, which was employed as the background for processing the spectra for CVD polymers. The spectra were averaged over 256 scans to improve the signal-to-noise ratio, and analyzed by OMNIC software package.

X-ray photoelectron spectroscopy (XPS) was performed on a Surface Science Instruments SSX-100 spectrometer equipped with a monochromatic Al Ka source at 1486.6 eV and operated at 150 W. The pass energy and step size for the survey scans were 160 and 1 eV. The samples were stored under vacuum (under 2×10-9 Torr) for 12 hours before measurements. The analysis areas were 0.4 mm×0.75 mm. Both angle resolved XPS (ARXPS) and standard XPS measurements at an electron emission angle of 55~ were performed. Argon plasma was employed for depth profiling. Charge neutralization was used with a 1 eV e-beam flood gun. The XPS spectra were analyzed using CasaXPS software (Casa Software Ltd.).

Film thicknesses were measured by a variable angle spectroscopic ellipsometer (VASE, J. A. Woollam M-2000, Lincoln, Nebr.). The data obtained at 65°, 70° and 75° incident angles were fit to a Cauchy-Urbach model using WVASE32 software. A Dektak profilometer (Veeco, Santa Barbara, Calif.) was used to verify the thickness measured by VASE system. The morphology and roughness of different surfaces were measured by using a Veeco Dimension 3100 atomic force microscope (AFM, Santa Barbara, Calif.) in the tapping mode. AFM probes with a spring constant of 40 N/m and a resonant frequency at about 300 kHz were employed for all the measurements. AFM images were analyzed by NanoScope Analysis software (Bruker Corporation).

Wetting properties of the surfaces were investigated by water contact angle (WCA) measurements, employing a Ramé-Hart Model 500 goniometer (Succasunna, N.J.) with an automatic dispensing system. In a typical measurement, 2.5 ptI, of deionized water was initially dropped onto the substrate surface to display an initial static WCA. Then the droplet volume was increased by 0.5 pL every 0.2 s for 25 times (steps) during the advancing process, and reduced at the same rate for another 25 times (steps). The contact angles (either advancing or receding) were recorded automatically by DROPimage Advanced software after finishing each step.

The film sheet resistance was measured using a four-point probe (Jandel MWP-6 multi-position wafer probe, Jandel Engineering Ltd., Leighton Buzzard, UK). Averages were obtained over 10 measurements at different locations. The conductivity of PEDOT and its derivatives was then calculated based on the sheet resistance and film thickness values, as shown in equation 1.

$$\sigma(S/m) = \frac{1}{Rs \times t} \quad (1)$$

Where, $\sigma$ is the conductivity with a unit of S/m (or S/cm), Rs is the sheet resistance in ohm-per-square, t is film thickness in m (or cm).

Adhesion Force Measurements

Figure 5A:
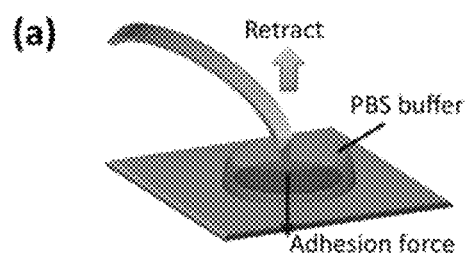
FIG. 5A depicts the probe surface interaction during a MFP measurement in PBS buffer.

The adhesion force between functionalized molecular force probes and different surfaces were measured by a MFP-3D instrument (Asylum Research, Santa Barbara, Calif.), following procedures established in the literature. A schematic is shown in FIG. 5A. In brief, molecular force probes are AFM cantilevers (spring constant 0.06 N/m, Novascan, Ames, Iowa) that were end-attached with functionalized spherical $SiO_2$ colloids at a diameter of 600 nm (FIG. 10). The $SiO_2$ colloids were coated with 2-nm Cr and 50-nm Au, and further functionalized with self-assembled monolayers bearing bovine serum albumin (-BSA) moieties, methyl (—$CH_3$), carboxylic acid (—COOH) or amine (—$NH_3$) groups. The force spectroscopy measurements were carried out in a PBS buffer (pH 7.4), with molecular force probes approaching target surfaces at a constant AFM piezo displacement rate of 1 μm/s. The probe stops approaching once a 40 nN compression force was reached, and would hold still for a period of 0-10 s (i.e., dwelling), before retracting from the surface at the same displacement rate (1 pm/s). The maximum negative force recorded from the retraction portion of the force-distance curves (shown in FIG. 5B), at the detach point, was defined as adhesion force between the probe and the surface. The measurement was repeated at least 64 times at different locations for each tip-surface pair.

Zeta-Potential Measurements

Flat surface zeta-potentials (ζ) were measured by a SurPASS Electrokinetic Analyzer system (Anton Paar, Graz, Austria) equipped with a clamp cell for flat surfaces, using the streaming potential technique. The ζ-potential is calculated using equation 2:

$$\zeta = \frac{dU_{str}}{d\Delta p} \times \frac{\eta}{\varepsilon \times \varepsilon_0} \times \frac{L}{A} \times k \quad (2)$$

Here Ustr is the measured streaming potential, Δp is pressure difference, η is viscosity, ε is the dielectric coefficient of the electrolyte solution. $E_0$ is the vacuum permittivity. L/A is the cell constant of the streaming channel. k is the electrolyte conductivity. All the measurements were done in a standard phosphate-buffered saline (PBS) solution (pH 7.4). The ζ-potential data were analyzed by Attract software coming with the system.

Synthesis of Intrinsically Conductive PEDOT and Zwitterionic PEDOT

The first evidence for the formation of PEDOT by oCVD technique is the observation of significant intrinsic conductivity of the PEDOT films. As shown in Table 1, a 100 nm PEDOT film (deposited at a substrate temperature of 140° C.) displayed a conductivity of 538 S/cm, which is typical for oCVD synthesized PEDOT films that are >100 nm in thickness. However, the film conductivity was reduced to 155 S/cm after water soaking for 3 days, which may be due to the loss of dopants during the soaking process. It was also found that converting PEDOT films to zwitterionic PEDOT films (FIG. 1A) slightly increased the film conductivity to 668 S/cm, but water soaking process again reduced the conductivity to 172 S/cm. Nevertheless, the intrinsic conductivity observed in PEDOT and zwitterionic PEDOT ultra-thin films, before and after water soaking, is crucial for applications such as electrolysis based self-cleaning of membrane filtration/desalination system and electrodes in biomedical applications. The slight increase in the film conductivity indicates that the incorporated zwitterions may have behaved as the covalently bonded dopants in addition to the halide dopants (Br$^-$) that are already in the film.

TABLE 1

Conductivity of ultra-thin PEDOT and zwitterionic PEDOT thin films

| Films | Thickness | Conductivity (after synthesis) | Conductivity (after 3 day in water) |
| --- | --- | --- | --- |
| PEDOT | 100 nm | 538 ± 22 S/cm | 155 ± 7 S/cm |
| Zwitterionic PEDOT | 100 nm | 668 ± 38 S/cm | 172 ± 8 S/cm |

Figure 2:
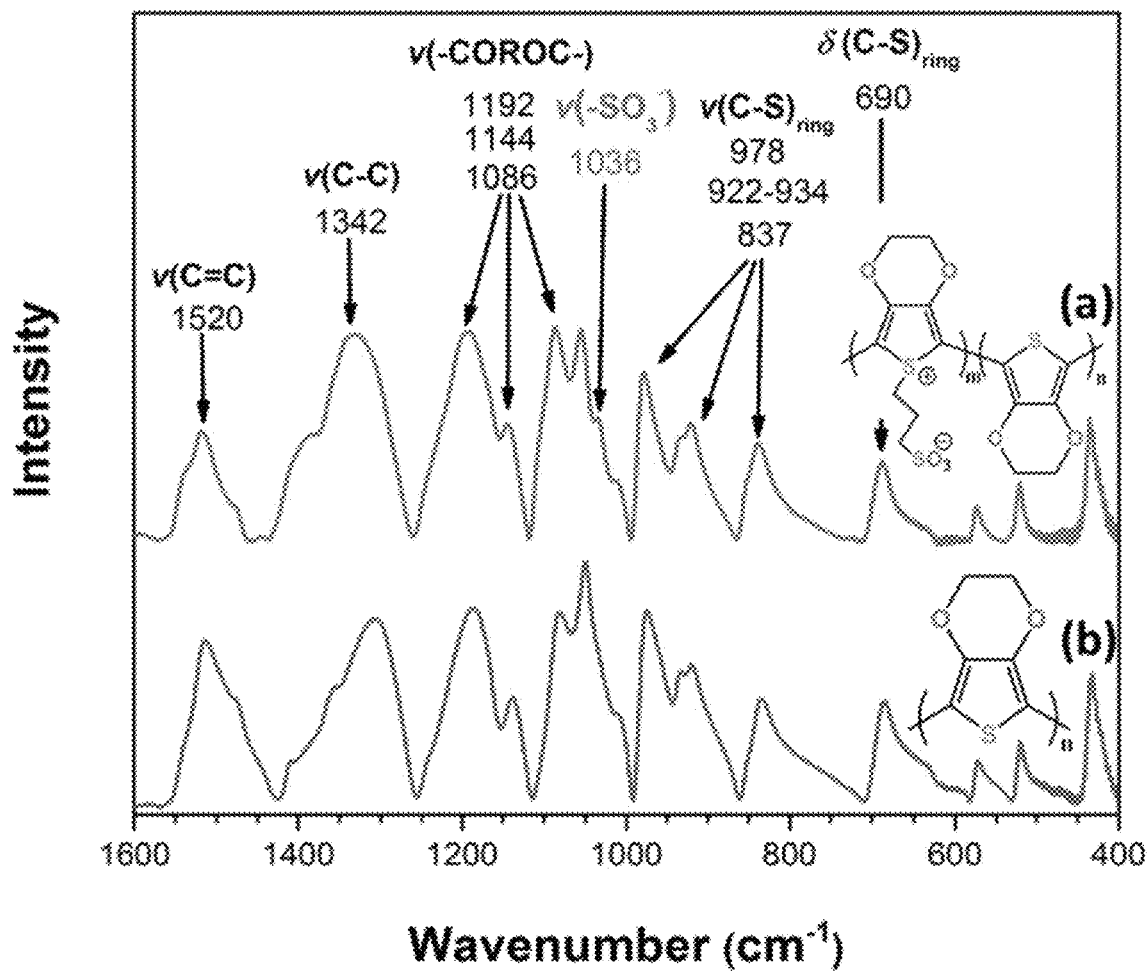
FIG. 2 depicts the Fourier transform infrared spectroscopy (FTIR) spectra of zwitterionic PEDOT synthesized by treating oxidative chemical vapor deposited PEDOT with 1,3-propanesultone vapor, and washed with water to remove excess 1,3-propanesultone; and untreated PEDOT synthesized by oCVD. (ν represents stretching vibration, δ represents in-plane deformation vibration).

The successful synthesis of PEDOT and zwitterionic PEDOT were also confirmed by FTIR measurement. FIG. 2 shows the FTIR spectra of 100 nm ultra-thin films of PEDOT and zwitterionic PEDOT. As is apparent, the spectra for PEDOT and zwitterionic PEDOT are almost identical, except for the emergence of a new band at 1036 cm$^{-1}$ in zwitterionic PEDOT, representing the symmetric stretching of $-SO_3^-$ group in sulfobetaine moiety. In addition, vibrations at 1520 cm$^{-1}$ and 1342 cm$^{-1}$ originate from the stretching of C═C and C—C bond in the thiophene ring. Vibrations at 1192 cm$^{-1}$, 1144 cm$^{-1}$ and 1086 cm$^{-1}$ represent the stretching in the alkylenedioxy group. The stretching and bending vibrations of C—S bond are at 978 cm$^{-1}$, 922-934 cm$^{-1}$, 837 cm$^{-1}$ and 690 cm$^{-1}$. Furthermore, it should be noted that the FTIR spectrum shown in FIG. 2B is typical for oCVD synthesized PEDOT.

Figure 3A:
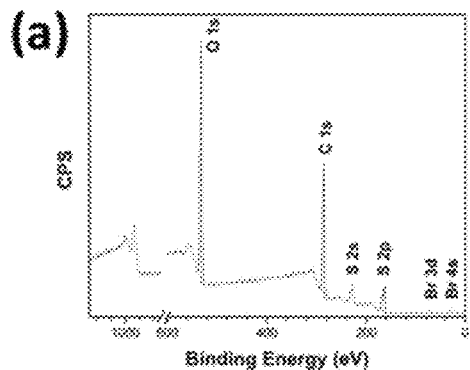
FIG. 3A depicts an X-ray photoelectron spectroscopy (XPS) spectra of zwitterionic PEDOT and untreated PEDOT. Specifically, the survey scan for zwitterionic PEDOT (with excess 1,3-propanesultone removed by water washing)
Figure 3B:
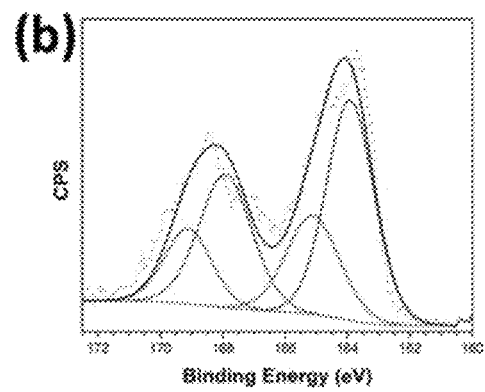
FIG. 3B depicts an XPS spectra of zwitterionic PEDOT and untreated PEDOT. Specifically, the angle resolved XPS S 2p spectrum for water washed zwitterionic PEDOT at a collection angle of 0° (equivalent to top 10 nm).
Figure 3C:
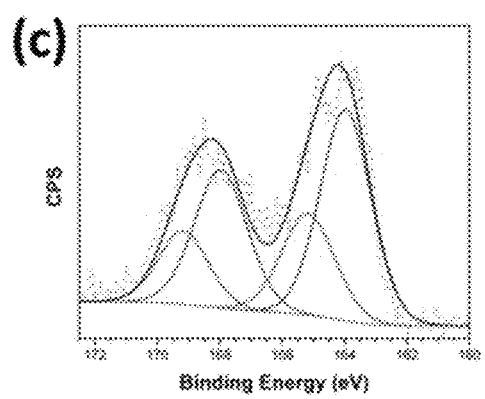
FIG. 3C depicts an XPS spectra of zwitterionic PEDOT and untreated PEDOT. Specifically, the angle resolved XPS S 2p spectrum for water washed zwitterionic PEDOT at a collection angle of 70° (equivalent to top 3 nm)
Figure 3D:
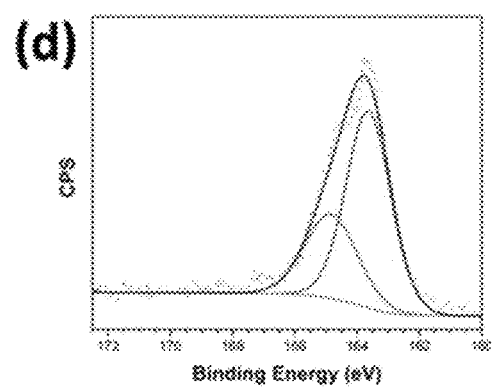
FIG. 3D depicts an XPS spectra of zwitterionic PEDOT and untreated PEDOT. Specifically, the high resolution XPS S 2p spectrum for water washed zwitterionic PEDOT, with top 20 nm sputtering off by Ar plasma.
Figure 3E:
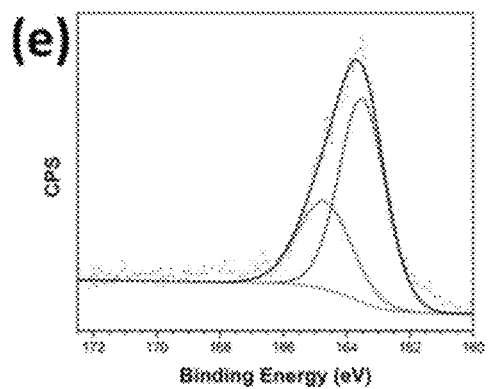
FIG. 3E depicts an XPS spectra of zwitterionic PEDOT and untreated PEDOT. Specifically, the high resolution XPS S 2p spectrum for PEDOT synthesized by oCVD, followed by HBr acid wash and methanol wash.
Figure 3F:
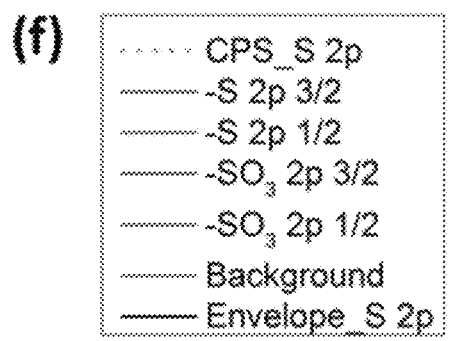
FIG. 3F depicts the legend for plots in FIGS. 3B to 3E.
Figure 4A:
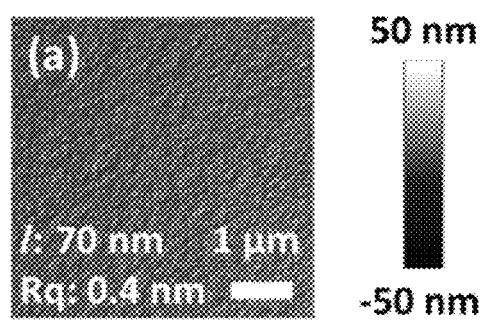
FIG. 4A depicts the atomic force microscopy (AFM) morphology for zwitterionic p4VP-DVB.
Figure 4B:
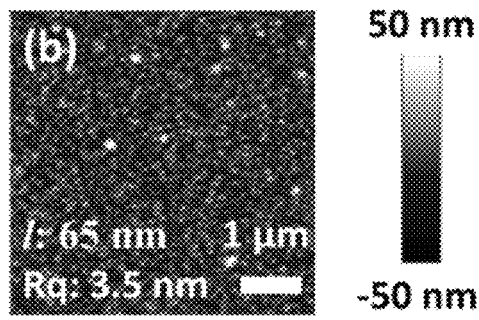
FIG. 4B depicts the AFM morphology for amphiphilic pPFDA-HEMA.
Figure 4C:
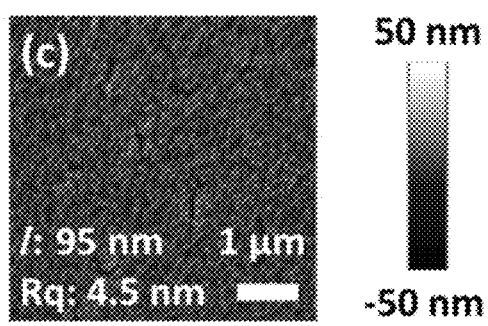
FIG. 4C depicts the AFM morphology for untreated PEDOT.
Figure 4D:
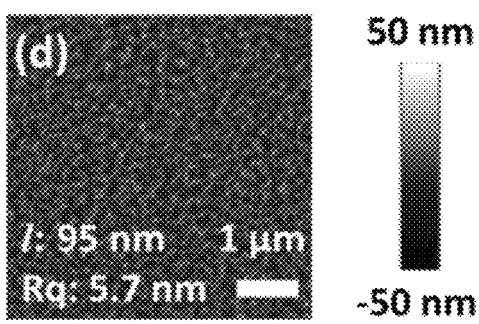
FIG. 4D depicts the AFM morphology for zwitterionic PEDOT.
Figure 4E:
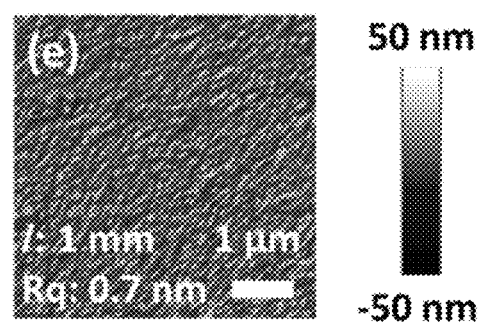
FIG. 4E depicts the AFM morphology for bare glass.
Figure 4F:
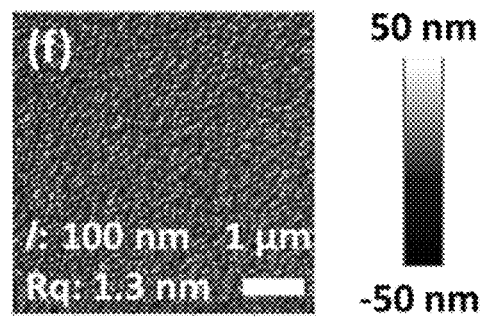
FIG. 4F depicts the AFM morphology for a gold coated (Au) silicon (Si) wafer.
Figure 4G:
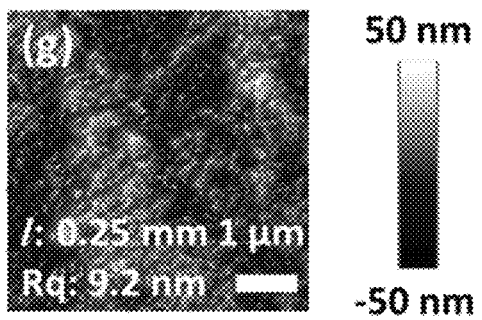
FIG. 4G depicts the AFM morphology for polydimethylsiloxane (PDMS).

The successful synthesis of PEDOT and zwitterionic PEDOT ultra-thin films was further confirmed by XPS measurement. FIG. 3A depicts the survey scan of the zwitterionic PEDOT, confirming the existence of carbon, oxygen and sulfur elements in the film structure. The additional weak peaks at 70.1 eV and 26.9 eV are Br 3d and Br 4s signal due to the HBr acid rinse of oCVD PEDOT. Notably, no Fe signal from the iron (III) chloride oxidant was detected, indicating that the oxidant was completely removed by the acid and methanol washing procedure. The survey scan for pristine oCVD synthesized PEDOT with HBr rinsing and methanol wash (not shown) is similar to that of zwitterionic PEDOT, as the 1,3-propane sultone vapor treatment did not add additional elements to the PEDOT film. In addition, the angle resolved high resolution core level S 2p peaks of zwitterionic PEDOT collected at 0° and 70° are shown in FIG. 3B and 3C. Two types of sulfur bonding environment with spin-split doublet (S 2p3/2 and S 2p1/2 with an 1.2 eV) were found in the XPS spectra due to the co-existence of sulfobetaine moiety bearing zwitterionic PEDOT and the unreacted PEDOT. Peaks with binding energies of 163.9 eV and 165.1 eV originate from S 2p3/2 and S 2p1/2 of unreacted PEDOT and sulfonium cation.18, 41, 42 Similarly, peaks with binding energies of 167.9 eV and 169.1 eV represent S 2p3/2 and S 2p1/2 signal of $0SO_3^-$ moiety. At angle 0° (equivalent to top 10 nm), the area ratio for four peaks at 163.9 eV, 165.1 eV, 167.9 eV and 169.1 eV is 40.19: 20.10: 26.47: 13.24, corresponding to a percentage of $SO_3^-$ moiety bearing EDOT units of 65.59% (the calculation is shown in FIG. 14). By employing the same calculation method, the percentage of $SO_3^-$ bearing EDOT units at top 3 nm (at a 70° collection angle) appeared to be 68.10%, indicating a slightly higher concentration of $SO_3^-$ groups at the surface. Additional depth profiling (by Ar ion sputtering) of the zwittionic PEDOT film revealed that the $SO_3^-$ groups were mostly confined at the top 20 nm of the film, because the core level S 2p peak of zwitterionic PEDOT film at 20 nm deep (with top 20 nm sputtered off) is identical with the S 2p peak of pristine oCVD synthesized PEDOT film washed with HBr acid and methanol, both with single sulfur bonding environment (FIGS. 3D and 3E).

Surface Morphology of Seven Surfaces Included in Fouling-Resistance Comparison

In order to put the result of fouling-resistance obtained from different surfaces into perspective, the surface morphology of seven different surfaces were imaged by AFM to make sure each surface are pinhole-free and has relatively smooth surfaces, because a rougher surface could increase the contact area between the foulant and the surface, and increase the fouling intendancy accordingly. Among seven surfaces, PEDOT and its derivative zwitterionic PEDOT was synthesized via oCVD process as discussed in the previous section, additional two fouling-resistant control surfaces zwitterionic p4VP-DVB and amphiphilic pPFDA-HEMA$_4$ were synthesized via iCVD process based on previous studies. The successful synthesis of these two iCVD films was confirmed by the FTIR spectra shown in FIGS. 11A and 11B. Fouling-resistant glass and fouling-prone gold coated silicon wafer and PDMS are all commercially available.

As depicted in FIG. 4, all surfaces are pinhole-free, and relatively smooth at nanoscale. However, the surface roughness of seven surfaces included in the comparison is different, with the relative values being zwitterionic p4VP-DVB<glass<gold coated silicon wafer<amphiphilic pPFDA-HEMA<zwitterionic PEDOT<PEDOT<PDMS surfaces, indicating a higher fouling intendancy can be expected for rougher PDMS than for smoother zwitterionic p4VP-DVB.

Water Contact Angle (WCA) and ζ-Potential of Seven Surfaces Included in Fouling-Resistance Comparison Water contact angle (WCA) and ζ-potential measurements have been employed to characterize the wettability and surface charge of seven surfaces, because these two properties are important factors affecting the fouling-resistance of a specific surface. Table 2 shows the advancing WCAs, receding WCAs and ζ-potentials of seven surfaces. By comparing the value of advancing and receding WCAs, it is clear that zwitterionic PEDOT, PEDOT, zwitterionic p4VP-DVB and glass have relatively similar surface wettability, and are more hydrophilic than the rest three surfaces (amphiphilic pPFDA-HEMA, gold coated silicon wafer and PDMS). This could be especially true in the underwater environment, because only small differences in receding WCA values were observed. The similarity in the surface wettability of these four surfaces also imply that the alkoxy group (—O—$CH_2$—$OH_2$—O—) in PEDOT, zwitterions in zwitterionic PEDOT and zwitterionic p4VP-DVB, and hydroxyl group (—OH) on glass surface have similar surface hydration level. In contrast, the hydroxyl group bearing amphiphilic pPFDA-HEMA appears to be more hydrophobic than above four surfaces, with a large WCA hysteresis, which is due to the copolymerization with fluorinated groups. For the rest two surfaces, gold surface is relatively more hydrophobic due to the lack of hydrophilic surface functionality, while PDMS is most hydrophobic due to its highly hydrophobic dimethylsiloxane repeat unit (—O—Si($CH_3$)$_2$—). The variation observed in surface wettability is expected to make difference on the fouling resistance of the surfaces.

In addition to the WCA values, the surface ζ-potentials of seven surfaces are shown in Table 2. The negative c-potentials recorded for seven surfaces indicate these seven surfaces are negatively charged in the aqueous solution environment, either due to the acid-base reactions of the surface functionality, or the adsorption of negatively charged ions on the surface. The exact reason for negative charges on PEDOT and zwitterionic PEDOT films is not clear. However, we suspect it is mainly caused by the adsorption of negative charge on alkoxy group rich surface, which was observed before in polyethylene glycol functionalized nanoparticle system. The same research also revealed that this adsorption effect was magnified by using PBS buffer (pH 7.4), which has high ionic strength. This may explain the relatively large negative c-potentials observed for both PEDOT (−62.3 mV) and zwitterionic PEDOT (−50.9 mV) films, since both surfaces have significant alkoxy group coverage (100% vs 60%). Moreover, the slight lower ζ-potential of PEDOT reflected the higher coverage of alkoxy group on the surface. Zwitterionic p4VP-DVB, on the other hand, is supposed to have zero ζ-potential if only zwitterion groups are presented on the surface. Nevertheless, the unavoidable oxidation of the residue double bonds on DVB crosslinker can introduce hydroxyl groups (—OH) and carboxylic acid groups (—COOH) to the surface, which display a negative ζ-potential at neutral pH. Similarly, the negative ζ-potentials observed for amphiphilic pPFDA-HEMA and bare glass are also owing to the hydroxyl groups on the HEMA repeat unit and glass surface, respectively, which are comparable to the values reported in the literature. As for gold and PDMS, the favorable adsorption of negative ion on the hydrophobic surfaces should be the reason for their negative ζ-potentials, which are comparable to the values reported in previous studies. Based on the electric repulsion and attraction mechanism, the negative charges on seven surfaces are expected to reduce their adhesion forces with negatively charged —COOH probe, and enhance their adhesion forces with positively charged —$NH_3$ probe.

TABLE 2

Water contact angle (WCA) and ζ-potential of different surfaces.

| Surfaces | Advancing WCA | Receding WCA | û-potential at pH 7.4 (in PBS buffer) |
|---|---|---|---|
| Zwitterionic PEDOT | 57 ± 2° | 20 ± 2° | −50.9 ± 3.8 mV |
| PEDOT | 62 ± 2° | 22 ± 3° | −62.3 ± 5.1 mV |
| Zwitterionic p4VP-DVB | 45 ± 2° | 21 ± 3° | −20.2 ± 3.0 mV |
| Amphiphilic pPFDA-HEMA | 123 ± 3° | 34 ± 6° | −29.7 ± 2.5 mV |
| Glass | 46 ± 1° | 17 ± 3° | −52.3 ± 1.9 mV |
| Gold | 83 ± 2° | 33 ± 3° | −27.4 ± 2.1 mV |
| PDMS | 120 ± 4° | 71 ± 3° | −61.5 ± 4.4 mV |

Figure 5B:
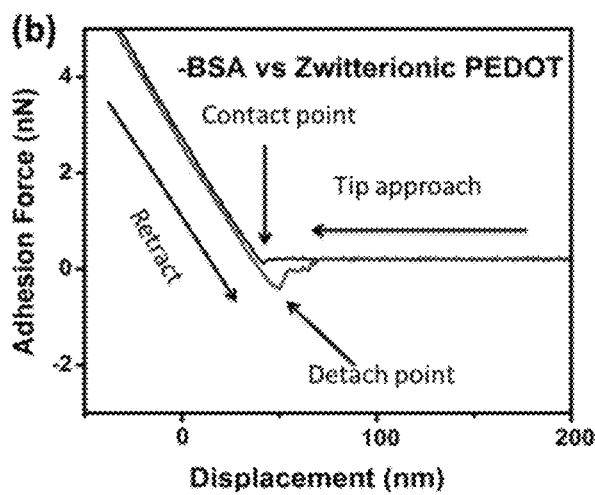
FIG. 5B depicts a force/displacement graph measured by MFP.
Figure 5C:
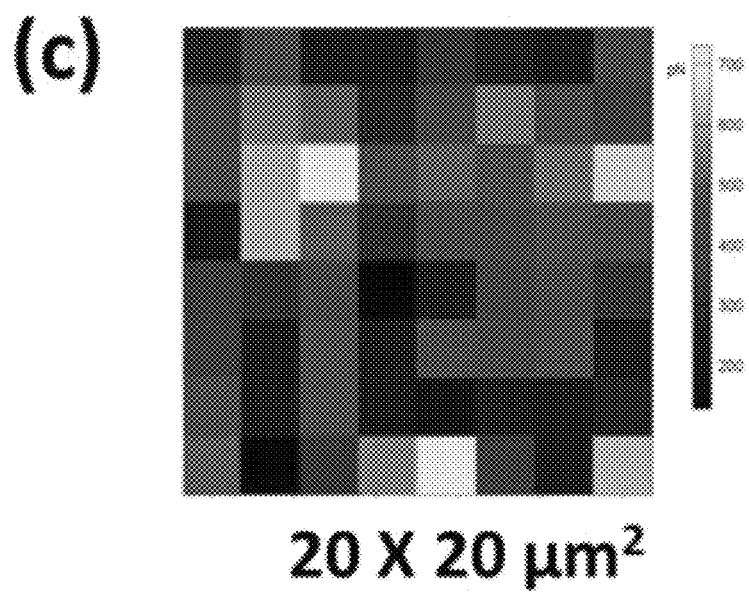
FIG. 5C depicts an 8 by 8 force map showing the variation of adhesion forces between the probe and the surface at different locations.
Figure 5D:
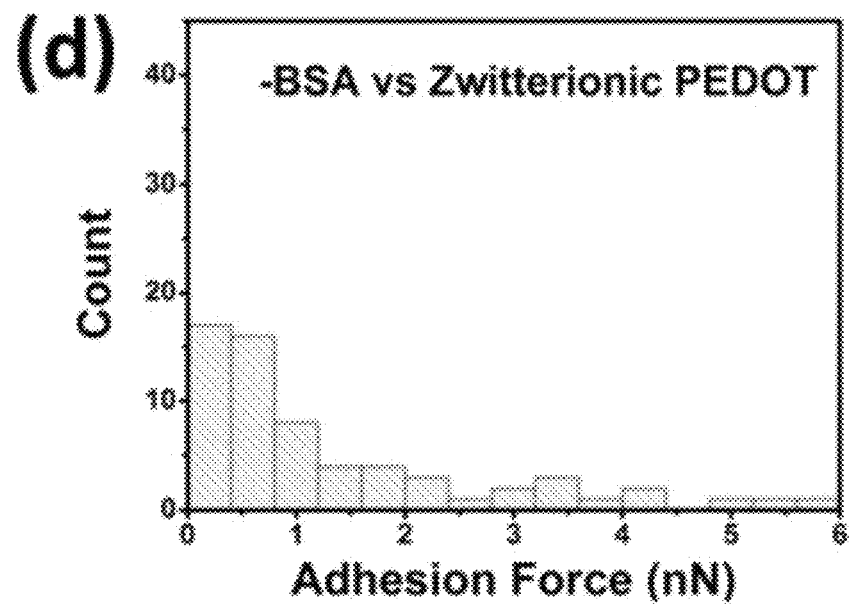
FIG. 5D depicts the histogram of adhesion force based on the force map.

Surface Fouling Resistance Evaluated by MFP Based Surface Adhesion Force Measurement The fouling-resistant performances of PEDOT and zwitterionic PEDOT were evaluated by the MFP technique, which is a quantitative and highly sensitive technique for adhesion force measurement. A schematic of adhesion force measurement in PBS buffer is shown in FIG. 5A. The measurement is carried out in an Asylum MFP-3D (FIG. 9) for zwitterionic PEDOT using a -BSA functionalized force probe, which results in a force-displacement curve as shown in FIG. 5B. In this force-displacement curve, the black curve represents the change in the repulsive force (i.e., the positive force) between the AFM force probe (or cantilever) and the surface when the probe approaches and contacts the surface. In contrast, the red curve represents the scenario where the probe retracts from the surface after making the contact. The maximum negative force obtained at the detach point is defined as the adhesion force between the probe and the surface. The measurement was repeated at least 64 times on an 8 by 8 grid of 400 um$^2$ (FIG. 5C), and the histogram of the resulted adhesion forces is shown in FIG. 5D. As a result, the fouling-resistance of a surface toward a specific type of foulant can be evaluated by the mean value of the adhesion force between that surface and a functionalized force probe resembling the type of the foulant. In particular, a smaller adhesion force indicates a better fouling-resistance of a surface toward the foulant. It should be noted that the effectiveness of the MFP based adhesion force measurement has been confirmed in multiple occasions where researchers employed different second evaluating techniques for comparison, such as fouling caused membrane flux reduction, fluorescent image of the foulant growth on the surface, and QCM-D studies on foulant attachment.

Aside from the pair of zwitterionic PEDOT surface and -BSA functionalized force probe, MFP based adhesion force measurements were also carried out for six other surfaces (PEDOT, zwitterionic p4VP-DVB, amphiphilic pPFDA-HEMA, glass, gold coated silicon wafer and PDMS), and force probes with three other functionalities (—$CH_3$, —$NH_3$ and —COOH). -BSA functionalized probe was chosen as the analog of a protein foulant, which has both hydrophobic units and hydrophilic units, with positive and negative charges. —$CH_3$ functionalized probe resembles the hydrophobic foulant, which interacts with surface via hydrophobic interactions, a higher adhesion force may indicate a poor hydration level of the surface. Similarly, —$NH_3$ and —COOH functionalized probes are analogs for positive charged and negatively charged foulants, respectively, their adhesion forces can indicate the surface charge situation. The adhesion force results are summarized in FIG. 5E and Table 3.

TABLE 3

The adhesion force between the surface and the functionalized probe measured by the MFP technique.

| | Zwitterionic p4VP-DVB | Amphiphilic pPFDA-HEMA | PEDOT | Zwitterionic PEDOT | Bare Glass | Gold | PDMS |
|---|---|---|---|---|---|---|---|
| -BSA | 0.32 nN | 0.91 nN | 2.00 nN | 1.72 nN | 2.11 nN | 12.2 nN | 29.3 nN |
| —$CH_3$ | 2.14 nN | 5.98 nN | 2.01 nN | 2.14 nN | 1.38 nN | 34.4 nN | 38.9 nN |
| —$NH_3$ | 0.50 nN | 3.39 nN | 1.62 nN | 1.33 nN | 2.16 nN | 6.15 nN | 28.6 nN |
| —COOH | 0.65 nN | 0.42 nN | 0.92 nN | 0.67 nN | 2.79 nN | 3.54 nN | 5.82 nN |

Comparing Zwitterionic PEDOT with Pristine PEDOT

Figure 5E:
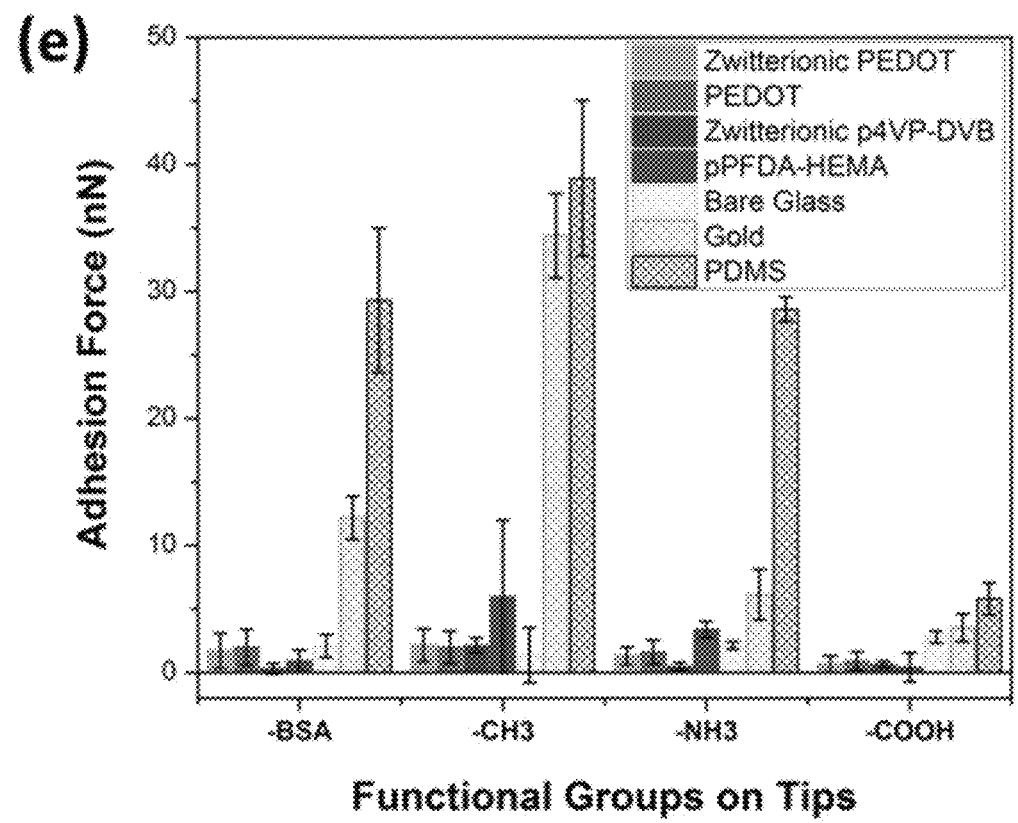
FIG. 5E depicts the adhesion forces between functionalized probes and different surfaces measured by MFP for seven surfaces.

As depicted in FIG. 5E and Table 3, the mean adhesion forces between zwitterionic PEDOT and four different force probes are: 1.72 nN (with -BSA), 2.14 nN (with —$CH_3$), 1.33 nN (with —$NH_3$) and 0.67 nN (with —COOH). The corresponding values of the adhesion force between PEDOT and the probes appear to be very similar, which are: 2.00 nN (-BSA), 2.01 nN (with —$CH_3$), 1.62 nN (with —$NH_3$) and 0.92 nN (with —COOH), respectively. The statistical analysis (i.e., a 2-tail t-test) of the adhesion force data reveals that the two set of data are basically identical at a 95% confidence level, except for a 1.5% difference in the case of —COOH probe (FIGS. 12 and 13). This result indicates the fouling resistances of zwitterionic PEDOT and PEDOT surfaces are fairly close with each other, despite the addition of zwiterions in the zwitterionic PEDOT film. One possible explanation is that the fouling-resistance of the alkoxy groups (—O—CH2-CH2-O—) in the PEDOT structure is comparable to that of the zwitterions, which is consistent with a previous study on the similar fouling-resistances observed for polyethylene glycol and poly(sulfobetaine-methacrylate) based zwitterionic polymer, although zwitterion generally have better hydration than polyethylene glycol based structures. In addition, one should consider that 60% of the zwitterionic PEDOT surface is also covered by alkoxy groups (vs 100% coverage in the case of pristine PEDOT). In detail, the ratio of zwitterion: alkoxy groups presented on the surface of zwitterionic PEDOT can be calculated based on the percentage of PEDOT repeat unit get converted (68.1%), which is 0.681: 1. Therefore, about 60% of the zwitterionic PEDOT surface area was occupied by alkoxy groups, which is significant as opposed to the 100% coverage in the case of PEDOT. The relatively small difference in the surface coverage of alkoxy groups is also evidenced by the comparable advancing WCAs, receding WCAs and surface η-potentials measured for both surfaces (Table 2). In short, the similarities in fouling-resistance of zwitterion and akoxy groups, and the significant coverage of akoxy group on both surfaces are believed to be the reasons for the negligible difference observed in fouling-resistance of zwitterionic PEDOT and pristine PEDOT.

Comparing PEDOT Based Films with Fouling-Resistant Zwitterionic p4VP-DVB, Amphiphilic pPFDA-HEMA, Glass Surfaces and Fouling-Prone Gold, PDMS Surfaces Based on the results shown in FIG. 5E and Table 3, the adhesion force between the surface and -BSA force probe has the following relative strength: zwitterionic p4VP-DVB (0.32 nN)<amphiphilic pPFDA-HEMA (0.91 nN)<zwitterionic PEDOT (1.72 nN)≈PEDOT (2.00 nN)≈glass (2.11 nN), demonstrating the protein fouling-resistance of zwitterionic PEDOT and PEDOT synthesized in this study is comparable to that of glass surface, and is only slightly lower than that of zwitterionic p4VP-DVB and amphiphilic pPFDA-HEMA. The trend was also confirmed by the statistical analysis results shown in FIGS. 12 and 13, in which no statistical difference in the -BSA adhesion force can be drawn for zwitterionic PEDOT, PEDOT and glass surfaces at a 95% confidence level, while zwitterionic p-4VP-DVB and amphiphilic pPFDA-HEMA are 60.7% and 23.4% less attractive toward -BSA force probe than zwitterionic PEDOT, respectively.

For the pair of zwitterionic PEDOT and zwitterionic p4VP-DVB, the difference found in the protein fouling-resistance is very likely the result of surface charge and the hydrogen bonding capability, since the adhesion force of —$CH_3$ probe are almost identical for zwitterionic PEDOT and zwitterionic p4VP-DVB (FIG. 5E and Table 3), indicating a similar hydration level for both surfaces. In particular, the zwitterionic p4VP-DVB with a small negative charge (−20.2 mV) is relatively less attractive toward the positively charged part of the BSA protein than zwitterionic PEDOT surface (−50.9 mV) (Table 2). In addition, the alkoxy groups on the zwitterionic PEDOT surface can form hydrogen bond with —COOH and —$NH_3$ tips, which could result in higher adhesion forces. As for amphiphilic pPFDA-HEMA, the low adhesion force toward -BSA probe and high adhesion force toward —$CH_3$ rooted in the molecular-scale compositional heterogeneity of this unique CVD copolymer.

In addition, the fouling resistance of the intrinsically conductive PEDOT and zwitterionic PEDOT is significantly better than that of gold and PDMS. As shown in FIG. 5E and Table 3, gold and PDMS both displayed large adhesion forces for all four types of functionalized probes. Taking gold/-BSA and PDMS/-BSA interactions as examples, the adhesion forces for these two pairs are 576% and 1519% more than that between zwitterionic PEDOT and -BSA. Similarly, the adhesion forces between —$CH_3$, —$NH_3$, —COOH probes and these two surfaces are also significantly higher. We suspect the lack of functionality on gold surface and the rich in hydrophobic functional groups on PDMS surface should account for such fouling-resistant behaviors. Such results also indicate that the surface roughness plays a rather small role in the fouling resistance of the surface, as compared to the surface functionality and surface wettability. Otherwise, a smoother gold surface (Rq at 1.3 nm) should have better fouling resistances than that of PEDOT (Rq at 4.5 nm) and zwitterionic PEDOT (Rq at 5.7 nm). In addition, for gold and PDMS, their adhesion forces with —COOH probe are smaller than their adhesions forces with other three probes. Such trend was also observed for other surfaces, which can be ascribed to the charge repulsion between the surface and the —COOH probe, since all these surfaces have either negative charges adsorbed on the surface, or negatively charged functionalities on the surface (Table 2).

Figure 8:
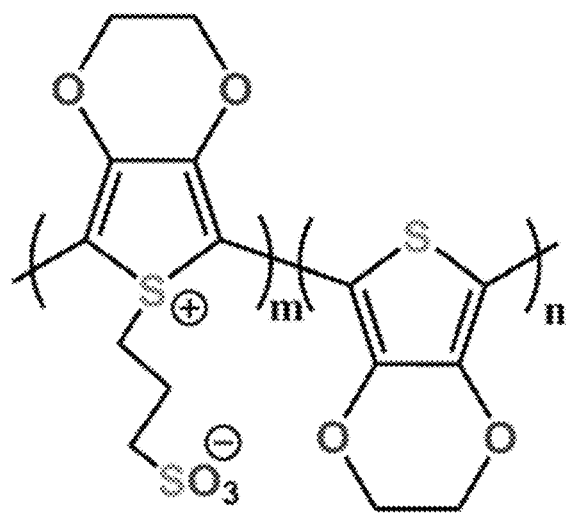
FIG. 8 depicts the chemical structure of zwitterionic PEDOT.

Calculation of the Percentage of EDOT Units Bearing $SO_3$ Moiety in Zwitterionic PEDOT Film Assuming the zwitterionic PEDOT has a random copolymer format with n units of unreacted EDOT and m units of reacted EDOT with sulfonium and $SO_3$ moiety (as depicted in FIG. 8), the ratio of S 2p peaks at two sulfur environments (163.9 eV and 165.1 eV vs 167.9 eV and 169.1 eV) can be defined as (m+n): m, as shown in FIG. 14, with m+n=1. Therefore, the percentage of EDOT units bearing $SO_3$ moiety for top 10 nm zwitterionic PEDOT film is 65.59%, the corresponding percentage for that of top 3 nm zwitterionic PEDOT is 68.10%.

Statistical Analysis of Adhesion Forces Obtained for Different Surface/Probe Pairs A 2-tail t-test for comparing the means of two small samples was used to measure the statistical significance of the differences in adhesion forces recorded for 7 surfaces, with a common sample number n=64. The procedure adopted is similar to that in the textbook, by first calculating the t score and p value, then converting to a confidence level. The detailed calculation was done on Excel. For instance, at a test statistic for a Null hypothesis $H_0$: $\mu_1=\mu_2$ (i.e., two means are equal), where t is based on degree of freedom $df=n_1+n_2-2$, and have $n=n_1=n_2$.

$$t=(\bar{x}_1-\bar{x}_2)/\sqrt{(s_1^2+s_2^2)/n}$$

In the above equation, sample mean $\bar{x}$ is used to replace the population mean $\mu$, s is the sample standard deviation. The p value is then calculated in Excel calculation based on the t score and df, using a function "T.Dist.2T", which is a 2-tail test.

The analysis was performed for 4 probe functionalities for 6 comparisons between zwitterionic PEDOT and other 6 surfaces. The results are listed in Table 3. The statistical differences at a 95% statistical confidence limit are listed as black numbers in Table 3. In addition, the corresponding apparent differences.

SUMMARY

Intrinsically conductive PEDOT and zwitterionic PEDOT ultra-thin films were synthesized via an oCVD technique. The successful synthesis of PEDOT and zwitterionic PEDOT ultra-thin films was confirmed by FTIR and XPS. The PEDOT and zwitterionic PEDOT ultra-thin films displayed electrical conductivities of 538 S/cm and 668 S/cm, respectively. The water treatment on PEDOT and zwitterionic PEDOT ultra-thin films reduced the conductivities to 155 S/cm and 172 S/cm, respectively. Using the MFP technique, the fouling resistances were characterized by the adhesion force between a functionalized probe and a surface. The smaller the adhesion force, the better the fouling resistance. Four force probes with four different functionalities (-BSA, —$CH_3$, —$NH_3$ and —COOH) were employed to resemble the surface interacting with the non-specific proteins, hydrophobic foulants, positively charged and negatively charged foulants. The fouling resistance of zwitterionic PEDOT is shown to be similar to that of PEDOT, possibly due to the significant coverage of alkoxy groups in both zwitterionic PEDOT (60%) and PEDOT (100%) and the similarity in fouling resistances of alkoxy group and zwitterionic group. In addition, the fouling resistances of zwitterionic PEDOT and PEDOT were found to be comparable to iCVD deposited fouling-resistant zwitterionic p4VP-DVB, amphiphilic pPFDA-HEMA and glass surface and much better than fouling-prone gold and PDMS surfaces. The surface functionality, surface wettability and surface charge situation all played important roles in the fouling resistance of each specific surface. In contrast, the surface roughness turns out to be a minor factor for the surface antifouling property of the studied seven surfaces. The high conductivities and good fouling-resistances displayed by zwitterionic PEDOT and PEDOT ultra-thin films indicate these CVD polymers have great potentials in applications such as electrolysis based self-cleaning of membrane filtration/desalination systems and electrodes in biomedical systems.

INCORPORATION BY REFERENCE

All of the US patents and US and PCT patent application publications cited herein are hereby incorporated by reference in their entirety as if each of them was specifically and individually indicated to be incorporated by reference. In case of conflict, the present application, including any definitions herein, will control.

EQUIVALENTS

While specific embodiments of the subject invention have been discussed, the above specification is illustrative and not restrictive. Many variations of the invention will become apparent to those skilled in the art upon review of this specification and the claims below. The full scope of the invention should be determined by reference to the claims, along with their full scope of equivalents, and the specification, along with such variations.

We claim:

1. A polymer, comprising a plurality of first repeat units, and a plurality of second repeat units; wherein
each of the first repeat units is independently represented by Formula IIA:

IIA

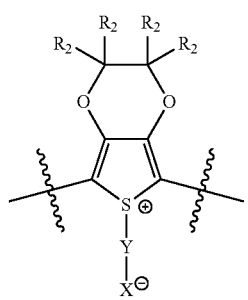

wherein, independently for each occurrence,
$R_2$ is H, alkyl, halo, nitro, or cyano;
Y is a linker that does not comprise an amide bond, an ester bond, or an ether bond; and
$X^\ominus$ is —$SO_3^\ominus$ or —$COO^\ominus$; and
each of the second repeat units is independently represented by Formula IIB:

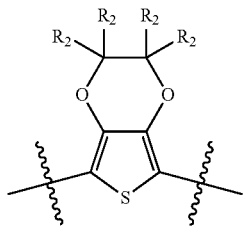

IIB wherein, independently for each occurrence,
R$_2$ is H, alkyl, halo, nitro, or cyano.

2. The polymer of claim 1, wherein R$_2$ is H.

3. The polymer of claim 1, wherein X$^\ominus$ is —SO$_3^\ominus$.

4. The polymer of claim 1, wherein the ratio of first repeat units to second repeat units is about 0.8:0.2.

5. The polymer of claim 1, wherein the ratio of first repeat units to second repeat units is about 2:1.

6. A composition, wherein the composition comprises a substrate and a coating material, wherein the coating material comprises a polymer of claim 1.

7. The composition of claim 6, wherein the substrate comprises a polysulfone, a polyimide, or a polyamide.

8. The composition of claim 6, wherein the substrate is a membrane.

9. The composition of claim 8, wherein the substrate is a reverse osmosis membrane.

10. An article, comprising a composition of claim 6; wherein the article is incorporated into a water desalination device.

11. A method, comprising
contacting, at a first flow rate, a first sample of water with a composition of claim 6, thereby producing a second sample of water,
wherein the first sample of water comprises a first concentration or first quantity of a substance; the second sample of water comprises a second concentration or second quantity of the substance; and the second concentration or second quantity is substantially lower than the first concentration or first quantity.

12. A method of coating a surface of a substrate, comprising the steps of:
providing a substrate;
exposing a surface of the substrate to plasma for a first period of time at a first pressure, thereby producing a conditioned surface of the substrate; and
contacting the conditioned surface of the substrate with the polymer of claim 1, thereby producing a polymer-coated substrate.

* * * * *